US011121971B2

United States Patent
Qin et al.

(10) Patent No.: US 11,121,971 B2
(45) Date of Patent: *Sep. 14, 2021

(54) METHOD AND APPARATUS FOR SWITCHING DATA BETWEEN VIRTUAL MACHINES, AND COMMUNICATIONS SYSTEM

(71) Applicant: Huawei Technologies Co., Ltd., Shenzhen (CN)

(72) Inventors: Chuanyu Qin, Nanjing (CN); Yunsong Lu, Santa Clara, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 112 days.

This patent is subject to a terminal disclaimer.

(21) Appl. No.: 16/016,082

(22) Filed: Jun. 22, 2018

(65) Prior Publication Data

US 2018/0302325 A1 Oct. 18, 2018

Related U.S. Application Data

(63) Continuation of application No. 14/683,131, filed on Apr. 9, 2015, now Pat. No. 10,033,637, which is a (Continued)

(51) Int. Cl.
*H04J 3/14* (2006.01)
*H04L 12/741* (2013.01)
(Continued)

(52) U.S. Cl.
CPC ........ *H04L 45/745* (2013.01); *H04L 12/4625* (2013.01); *H04L 49/70* (2013.01); *H04L 45/586* (2013.01); *H04L 45/74* (2013.01)

(58) Field of Classification Search
None
See application file for complete search history.

(56) References Cited

U.S. PATENT DOCUMENTS 7,227,838 B1 6/2007 O'Riordan
9,059,868 B2* 6/2015 Hernandez .......... H04L 12/4641
(Continued)

FOREIGN PATENT DOCUMENTS

CN 101459618 A 6/2009
CN 101465863 A 6/2009
(Continued)

OTHER PUBLICATIONS

Machine Translation and Abstract of Chinese Publication No. CN102147840, Aug. 10, 2011, 12 pages.
(Continued)

*Primary Examiner* — Kwang B Yao
*Assistant Examiner* — Juvena W Loo
(74) *Attorney, Agent, or Firm* — Conley Rose, P.C.

(57) ABSTRACT

A method for switching data between virtual machines is provided, the method includes acquiring data that is inside a physical host and needs to be sent to a destination node; determining, according to the data, whether the destination node is a node inside the physical host or a node outside the physical host; and when the destination node is a node inside the physical host, determining a destination virtual network interface card (NIC) port, and sending the data to a corresponding destination virtual machine using a virtual NIC corresponding to the destination virtual NIC port; or when the destination node is a node outside the physical host, determining a physical NIC port, and sending the data outside the physical host using a physical NIC corresponding to the physical NIC port. A corresponding apparatus and system are also provided.

20 Claims, 12 Drawing Sheets

Related U.S. Application Data continuation of application No. PCT/CN2013/073563, filed on Apr. 1, 2013.

(51) Int. Cl.
  *H04L 12/46* (2006.01)
  *H04L 12/931* (2013.01)
  *H04L 12/713* (2013.01)

(56) References Cited

U.S. PATENT DOCUMENTS

| | | | | |
|---|---|---|---|---|
| 2007/0140263 | A1* | 6/2007 | Mitome | H04L 12/4645 370/395.53 |
| 2008/0002663 | A1 | 1/2008 | Tripathi et al. | |
| 2008/0285555 | A1* | 11/2008 | Ogasahara | H04L 49/357 370/389 |
| 2010/0131636 | A1* | 5/2010 | Suri | H04L 45/00 709/224 |
| 2010/0306358 | A1 | 12/2010 | Droux et al. | |
| 2011/0299537 | A1* | 12/2011 | Saraiya | H04L 69/324 370/392 |
| 2012/0170477 | A1* | 7/2012 | Hieda | H04L 12/4625 370/252 |
| 2012/0278802 | A1 | 11/2012 | Nilakantan et al. | |
| 2012/0291026 | A1* | 11/2012 | Biswas | H04L 49/208 718/1 |
| 2012/0291028 | A1* | 11/2012 | Kidambi | H04L 49/602 718/1 |
| 2014/0254594 | A1* | 9/2014 | Gasparakis | H04L 69/324 370/392 |
| 2015/0016287 | A1 | 1/2015 | Ganichev et al. | |
| 2015/0049636 | A1* | 2/2015 | Tai | H04L 43/0817 370/254 |

FOREIGN PATENT DOCUMENTS

| | | |
|---|---|---|
| CN | 102147840 A | 8/2011 |
| CN | 102984043 A | 3/2013 |

OTHER PUBLICATIONS

Machine Translation and Abstract of Chinese Publication No. CN102984043, Mar. 20, 2013, 15 pages.
Machine Translation and Abstract of Chinese Publication No. CN101459618, Jun. 17, 2009, 19 pages.
Machine Translation and Abstract of Chinese Publication No. CN101465863, Jun. 24, 2009, 14 pages.
Foreign Communication From a Counterpart Application, Chinese Application No. 201380001038.4, Chinese Office Action dated Jul. 24, 2015, 17 pages.
Foreign Communication From a Counterpart Application, PCT Application No. PCT/CN2013/073563, English Translation of International Search Report dated Jan. 9, 2014, 2 pages.
Foreign Communication From a Counterpart Application, PCT Application No. PCT/CN2013/073563, English Translation of Written Opinion dated Jan. 9, 2014, 12 pages.

* cited by examiner

METHOD AND APPARATUS FOR SWITCHING DATA BETWEEN VIRTUAL MACHINES, AND COMMUNICATIONS SYSTEM

CROSS-REFERENCE TO RELATED APPLICATIONS

This application is a continuation of U.S. patent application Ser. No. 14/683,131, filed on Apr. 9, 2015, which is a continuation of International Application No. PCT/CN2013/073563, filed on Apr. 1, 2013, both of which are hereby incorporated by reference in their entireties.

TECHNICAL FIELD

The present disclosure relates to the field of communications technologies, and in particular, to a method and apparatus for switching data between virtual machines, and a communications system.

BACKGROUND

After virtualization technologies are developed, multiple virtual machines (VM) coexist in one host (also referred to as a physical host hereinafter). A virtual machine is presented as a normal physical machine to a user, and therefore, in addition to a data switching requirement between virtual machines, there is a communication requirement between a virtual machine and an external network.

Currently, mainstream data switching solutions for a virtual machine include virtual switching and physical switching, where the virtual switching refers to a behavior of simulating a physical switch using software, which is relatively complex to implement; and the physical switching refers to a behavior of implementing switching logic on a chip of a network interface card (NIC) or using a physical switch, that is, external data switching of a virtual machine occurs on hardware. For example, a device pass-through technology may be used to directly allocate a physical NIC port to a virtual machine, or a virtual function (VF) generated by a Single Root Input/Output (I/O) Virtualization (SR-IOV) NIC (wherein the VF is a virtual device simulated by an SR-IOV device) is used to enable a virtual machine to directly use a NIC, so that data switching may occur on a physical switch or a switching logic module on a NIC. The solution can eliminate consumption of a host caused by use of a network by a virtual machine, and has relatively desirable performance; moreover, a Layer 2 switch (L2 switch) inside a NIC queries a media access control (MAC) address forwarding of an internal VF, and there is no logical loop, so that an overhead of Spanning Tree Protocol (STP) is avoided, and implementation is relatively flexible.

Although such an existing physical switching solution has improved performance and flexibility compared with virtual switching, data switching efficiency of the physical switching solution is still not high enough. For example, all virtual machine communication needs to pass through a NIC first, and both communication with a unit inside a host and communication with a device outside the host consume Peripheral Component Interconnect (PCI) bus bandwidth, and the like. Moreover, in the solution, communication between virtual machines inside a host further affects communication between another virtual machine inside the host and a device outside the host.

SUMMARY

Embodiments of the present disclosure provide a method and apparatus for switching data between virtual machines, and a communications system, which can improve data switching efficiency without reducing performance and flexibility of a virtual machine, and eliminate, to a certain extent, impact of communication between virtual machines inside a host on communication between another virtual machine inside the host and a device outside the host.

According to a first aspect, an embodiment of the present disclosure provides a method for switching data between virtual machines, which includes acquiring data that is inside a physical host and needs to be sent to a destination node, where a MAC address of the destination node is carried in the data; determining, according to the MAC address that is of the destination node and carried in the data, whether the destination node is a node inside the physical host or a node outside the physical host; and when the destination node is a node inside the physical host, determining a destination virtual NIC port, and sending the data to a corresponding destination virtual machine using a destination virtual NIC corresponding to the destination virtual NIC port; or when the destination node is a node outside the physical host, determining a physical NIC port (out_port), and sending the data outside the physical host using a physical NIC corresponding to the physical NIC port.

In a first possible implementation manner, with reference to the first aspect, the determining, according to the MAC address that is of the destination node and carried in the data, whether the destination node is a node inside the physical host or a node outside the physical host may include determining whether the MAC address that is of the destination node and carried in the data exists in a first mapping table, where the first mapping table includes a correspondence between MAC addresses and virtual NIC ports; and when yes, determining that the destination node is a node inside the physical host; or when not, determining that the destination node is a node outside the physical host.

In a second possible implementation manner, with reference to the first possible implementation manner of the first aspect, the determining a destination virtual NIC port, and sending the data to a corresponding destination virtual machine using a destination virtual NIC corresponding to the destination virtual NIC port may include searching, according to the MAC address that is of the destination node and carried in the data, the first mapping table for the destination virtual NIC port (in_port) corresponding to the MAC address; and sending the data to the corresponding destination virtual machine using the destination virtual NIC corresponding to the destination virtual NIC port.

In a third possible implementation manner, with reference to the first aspect, the determining, according to the MAC address that is of the destination node and carried in the data, whether the destination node is a node inside the physical host or a node outside the physical host may include searching, according to the MAC address that is of the destination node and carried in the data, a first mapping table for a virtual NIC port corresponding to the MAC address, where the first mapping table includes a correspondence between MAC addresses and virtual NIC ports; and when the virtual NIC port corresponding to the MAC address is found, determining that the destination node is a node inside the physical host; or when the virtual NIC port corresponding to the MAC address is not found, determining that the destination node is a node outside the physical host; where the determining a destination virtual NIC port is determining the found virtual NIC port corresponding to the MAC address as the destination virtual NIC port.

In a fourth possible implementation manner, with reference to the first aspect, the determining a physical NIC port, and sending the data outside the physical host using a physical NIC corresponding to the physical NIC port may include acquiring a virtual NIC port used to receive the data; searching a second mapping table according to the virtual NIC port for a physical NIC port corresponding to the virtual NIC port, where the second mapping table includes a correspondence between virtual NIC ports and physical NIC ports; and sending the data outside the physical host using a physical NIC corresponding to the physical NIC port.

In a fifth possible implementation manner, with reference to the first possible implementation manner of the first aspect, the second possible implementation manner of the first aspect, the third possible implementation manner of the first aspect or the fourth possible implementation manner of the first aspect, the method may further include when it is detected that a back-end virtual NIC is connected to the physical host, generating a virtual NIC port, and adding, to the first mapping table, the virtual NIC port corresponding to a designated MAC address; and, when it is detected that the back-end virtual NIC is removed from the physical host, deleting, from the first mapping table, the virtual NIC port corresponding to the designated MAC address; where the first mapping table does not perform MAC address learning.

In a sixth possible implementation manner, with reference to the first aspect, the method may further include receiving data from outside of the physical host using a physical NIC, where a MAC address of a destination node is carried in the data from outside of the physical host; determining, according to the MAC address that is of the destination node and carried in the data from outside of the physical host, a corresponding destination virtual NIC port; and sending, to a corresponding destination virtual machine, the data from outside of the physical host using a destination virtual NIC corresponding to the destination virtual NIC port.

In a seventh possible implementation manner, with reference to the sixth possible implementation manner of the first aspect, the determining according to the MAC address that is of the destination node and carried in the data from outside of the physical host, a corresponding destination virtual NIC port may include searching, according to the MAC address that is of the destination node and carried in the data from outside of the physical host, a first mapping table for a virtual NIC port corresponding to the MAC address, where the virtual NIC port corresponding to the MAC address is the destination virtual NIC port, and the first mapping table includes a correspondence between MAC addresses and virtual NIC ports.

In addition, optionally, after the receiving data from outside of the physical host using a physical NIC, the method may further include, when the virtual NIC port corresponding to the MAC address is not found in the first mapping table according to the MAC address that is of the destination node and carried in the data from outside of the physical host, discarding the data from outside of the physical host.

According to a third aspect, an embodiment of the present disclosure further provides a communications system, which includes at least two physical hosts, where the at least two physical hosts include a first physical host and a second physical host, where, the first physical host is configured to acquire data that is inside the first physical host and needs to be sent to a destination node, where a MAC address of the destination node is carried in the data, determine, according to the MAC address that is of the destination node and carried in the data, whether the destination node is a node inside the physical host (that is, the first physical host) or a node outside the physical host; and when the destination node is a node inside the physical host, determine a destination virtual NIC port, and send the data to a corresponding destination virtual machine using a destination virtual NIC corresponding to the destination virtual NIC port; or when the destination node is a node outside the physical host, determine a physical NIC port, and send the data to the second physical host using a physical NIC corresponding to the physical NIC port; and the second physical host is configured to receive the data sent by the first physical host.

In a first possible implementation manner, with reference to the third aspect, the first physical host may be configured to acquire the data that is inside the physical host and needs to be sent to the destination node; determine whether the MAC address that is of the destination node and carried in the data exists in a first mapping table; and when the MAC address that is of the destination node and carried in the data exists in the first mapping table, determine that the destination node is a node inside the first physical host, search, according to the MAC address that is of the destination node and carried in the data, the first mapping table for a virtual NIC port corresponding to the MAC address, where the virtual NIC port corresponding to the MAC address is the destination virtual NIC port, and send the data to the corresponding destination virtual machine using the destination virtual NIC corresponding to the destination virtual NIC port; or if the MAC address that is of the destination node and carried in the data does not exist in the first mapping table, determine that the destination node is a node outside the physical host, determine the physical NIC port, and send the data to the second physical host using the physical NIC corresponding to the physical NIC port, where the first mapping table includes a correspondence between MAC addresses and virtual NIC ports.

In a second possible implementation manner, with reference to the third aspect, the first physical host is configured to acquire the data that is inside the physical host and needs to be sent to the destination node; search, according to the MAC address that is of the destination node and carried in the data, a first mapping table for a virtual NIC port corresponding to the MAC address; and when the virtual NIC port corresponding to the MAC address is found in the first mapping table, determine that the destination node is a node inside the first physical host, determine that the found virtual NIC port corresponding to the MAC address is the destination virtual NIC port, and send the data to the corresponding destination virtual machine using the destination virtual NIC corresponding to the destination virtual NIC port; or when the virtual NIC port corresponding to the MAC address is not found, determine that the destination node is a node outside the physical host, determine the physical NIC port, and send the data to the second physical host using the physical NIC corresponding to the physical NIC port, where the first mapping table includes a correspondence between MAC addresses and virtual NIC ports.

In a third possible implementation manner, with reference to the third aspect, the first possible implementation manner of the third aspect or the second possible implementation manner of the third aspect, the first physical host is configured to acquire a virtual NIC port used to receive the data, search a second mapping table according to the virtual NIC port for a physical NIC port corresponding to the virtual NIC port, and send the data outside the first physical host using a physical NIC corresponding to the physical NIC port, where the second mapping table includes a correspondence between virtual NIC ports and physical NIC ports.

In a fourth possible implementation manner, with reference to the third aspect, the first possible implementation manner of the third aspect or the second possible implementation manner of the third aspect, the second physical host is further configured to send data to the first physical host; the first physical host may further be configured to receive, using a physical NIC, the data sent by the second physical host, where a MAC address of a destination node is carried in the data, determine a corresponding destination virtual NIC port according to the MAC address of the data, and send, to a corresponding destination virtual machine using a destination virtual NIC corresponding to the destination virtual NIC port, the data from the second physical host.

According to a fourth aspect, an embodiment of the present disclosure further provides a physical host, which includes a processor located in a kernel space of the physical host, at least one virtual machine run in a user space of the physical host, and at least one physical NIC located at a hardware layer of the physical host, where the processor is configured to acquire data that is inside the physical host and needs to be sent to a destination node, where a MAC address of the destination node is carried in the data; determine, according to the MAC address that is of the destination node and carried in the data, whether the destination node is a node inside the physical host or a node outside the physical host; and when the destination node is a node inside the physical host, determine a destination virtual NIC port, and send the data to a corresponding destination virtual machine using a destination virtual NIC corresponding to the destination virtual NIC port, or when the destination node is a node outside the physical host, determine a physical NIC port, and send the data to a physical NIC corresponding to the physical NIC port; the virtual machine is configured to receive the data sent by the processor; and the physical NIC is configured to receive the data sent by the processor, and send the data outside the physical host.

In a first possible implementation manner, with reference to the fourth aspect, the processor may be configured to acquire the data that is inside the physical host and needs to be sent to the destination node; determine whether the MAC address that is of the destination node and carried in the data exists in a first mapping table, where the first mapping table includes a correspondence between MAC addresses and virtual NIC ports; and when the MAC address that is of the destination node and carried in the data exists in the first mapping table, determine that the destination node is a node inside the physical host, search, according to the MAC address that is of the destination node and carried in the data, the first mapping table for a virtual NIC port corresponding to the MAC address, where the virtual NIC port corresponding to the MAC address is the destination virtual NIC port, and send the data to the corresponding destination virtual machine using the destination virtual NIC corresponding to the destination virtual NIC port; or when the MAC address that is of the destination node and carried in the data does not exist in the first mapping table, determine that the destination node is a node outside the physical host, determine the physical NIC port, and send the data to the physical NIC corresponding to the physical NIC port.

In a second possible implementation manner, with reference to the fourth aspect, the processor may be configured to acquire the data that is inside the physical host and needs to be sent to the destination node; search, according to the MAC address that is of the destination node and carried in the data, a first mapping table for a virtual NIC port corresponding to the MAC address, where the first mapping table includes a correspondence between MAC addresses and virtual NIC ports; and when the virtual NIC port corresponding to the MAC address is found, determine that the destination node is a node inside the physical host, determine that the found virtual NIC port corresponding to the MAC address is the destination virtual NIC port, and send the data to the corresponding destination virtual machine using the destination virtual NIC corresponding to the destination virtual NIC port; or when the virtual NIC port corresponding to the MAC address is not found, determine that the destination node is a node outside the physical host, determine the physical NIC port, and send the data to the physical NIC corresponding to the physical NIC port.

In a third possible implementation manner, with reference to the fourth aspect, the first possible implementation manner of the fourth aspect or the second possible implementation manner of the fourth aspect, the processor may be configured to, when it is determined that the destination node is a node outside the physical host, acquire a virtual NIC port used to receive the data, search a second mapping table according to the virtual NIC port for a physical NIC port corresponding to the virtual NIC port, where the second mapping table includes a correspondence between virtual NIC ports and physical NIC ports, and send the data to a physical NIC corresponding to the physical NIC port.

In a fourth possible implementation manner, with reference to the fourth aspect, the first possible implementation manner of the fourth aspect or the second possible implementation manner of the fourth aspect, the physical NIC is further configured to receive data from outside of the physical host, where a MAC address of a destination node is carried in the data from outside of the physical host, and send, to the processor, the data from outside of the physical host; and the processor is further configured to determine, according to the MAC address that is of the destination node and carried in the data from outside of the physical host, a corresponding virtual NIC port, where the virtual NIC port corresponding to the MAC address is a destination virtual NIC port, and send the data to a corresponding destination virtual machine using a destination virtual NIC corresponding to the destination virtual NIC port.

In a fifth possible implementation manner, with reference to the fourth possible implementation manner of the fourth aspect, the processor is further configured to, when virtual NIC port corresponding to the MAC address is not found in the first mapping table according to the MAC address that is of the destination node and carried in the data from outside of the physical host, discard the data from outside of the physical host.

Using the following solution according to the embodiments of the present disclosure, data that is inside a physical host and needs to be sent to a destination node is acquired; it is determined, according to a MAC address that is of the destination node and carried in the data, whether the destination node is a node inside the physical host or a node outside the physical host; and if the destination node is a node inside the physical host, a destination virtual NIC port is determined, and the data is sent to a corresponding destination virtual machine using a virtual NIC corresponding to the destination virtual NIC port; or if the destination node is a node outside the physical host, a physical NIC port is determined, and the data is sent outside the physical host using a physical NIC corresponding to the physical NIC port. Because in the solution, during data switching of a virtual machine, communication between virtual machines inside a host is distinguished from communication between a virtual machine inside a host and a device outside the host.

Communication between virtual machines inside a host does not need to pass using a physical NIC, and instead, a destination virtual NIC port is directly determined, and communication is then performed with a destination virtual machine; that is, this case only involves copying of content between the virtual machines, and therefore, PCI bus bandwidth is not wasted, data switching efficiency can be improved, and communication between another virtual machine inside the host and a device outside the host is also not affected. In the case of communication between a virtual machine inside a host and a device outside the host, a physical NIC port is determined, and communication is then performed with the device outside the physical host using a physical NIC corresponding to the physical NIC port; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, and consumption caused by invalid data is reduced, thereby further improving data switching efficiency. In other words, the solution can improve data switching efficiency without lowering performance and flexibility of the solution, and eliminate, to a certain extent, impact of communication between virtual machines inside a host on communication between another virtual machine inside the host and a device outside the host.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person skilled in the art may still derive other drawings from these accompanying drawings without creative efforts.

DESCRIPTION OF EMBODIMENTS

Figure 1:
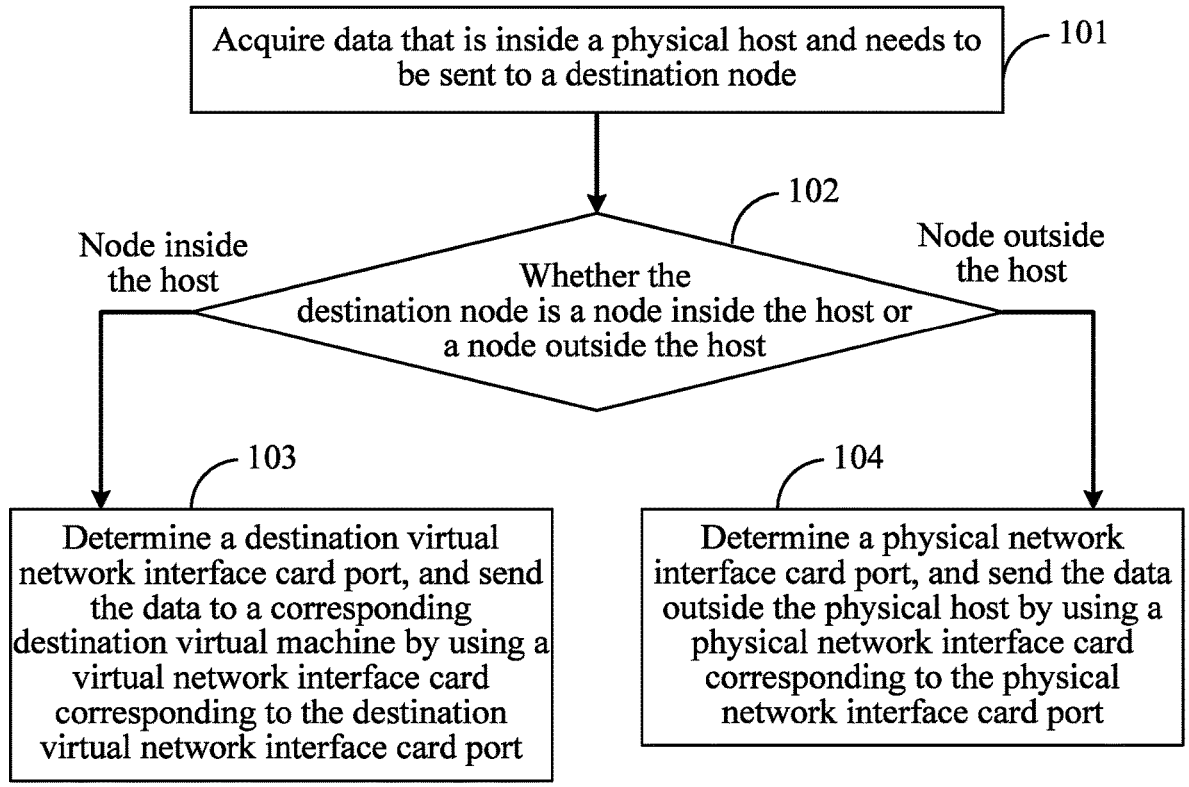
FIG. 1 is a flowchart of a method for switching data between virtual machines according to an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

For ease of understanding of the embodiments of the present disclosure, several elements to be introduced in the description of the embodiments of the present disclosure are first described here.

MAC address is a hardware address used for defining the location of a network device, and one NIC has one globally unique fixed MAC address.

Host is also referred to as a host system, and is a host where a virtual machine is located, and is also referred to as a physical host.

Eth0/local connection is a name of a NIC displayed in a linux/windows system.

Bridge is a module for simulating a switch in a linux kernel.

NIC includes a virtual NIC and a physical NIC.

Virtual NIC is a NIC simulated in a host to provide a network capability to a virtual machine; a virtual NIC does not have capabilities of receiving data from outside a host and transmitting data outside a host and needs to rely on a physical NIC; virtual NICs are usually categorized into a front-end virtual NIC and a back-end virtual NIC; in the embodiments of the present disclosure, the virtual NIC mainly refers to a back-end virtual NIC.

SR-IOV is a single root I/O virtualization technology, and multiple pieces of virtual hardware are simulated on one device and directly allocated to a virtual machine, thereby avoiding an overhead of software simulation.

VF is a virtual device simulated by an SR-IOV device.

STP-By interrupting a redundant link, the STP trims a bridge network with a loop into a tree topology without a loop, thereby preventing a broadcast storm from occurring in a Layer 2 network.

MAC address learning (MAC-learning) generates, by learning every packet that enters a switch, a mac-port table for use as a reference for forwarding, and is a basic working principle of a conventional switch.

The embodiments of the present disclosure provide a method and apparatus for switching data between virtual machines, and a communications system, which are described in detail below separately.

Embodiment 1

This embodiment of the present disclosure is described from the perspective of sending data by a virtual machine inside a physical host, and the physical host in this embodiment of the present disclosure may be a physical server or the like.

A method for switching data between virtual machines includes acquiring data that is inside the physical host and needs to be sent to a destination node, determining, according to a MAC address that is of the destination node and carried in the data, whether the destination node is a node inside the physical host or a node outside the physical host, and if the destination node is a node inside the physical host, determining a destination virtual NIC port, and sending the data to a corresponding destination virtual machine using a destination virtual NIC corresponding to the destination virtual NIC port; or if the destination node is a node outside the physical host, determining a physical NIC port (out_port), and sending the data outside the physical host using a physical NIC corresponding to the physical NIC port.

As shown in FIG. 1, a specific procedure may be as follows.

101. Acquire data that is inside a physical host and needs to be sent to a destination node, where a MAC address of the destination node is carried in the data.

The destination node may be a node inside the physical host, and is referred to as a node inside the host for short, for example, a virtual machine; or may also be a node outside the physical host, and is referred to as a node outside the host for short, for example, a device (for example, another physical host) outside the host.

102. Determine, according to the data acquired in step 101, whether the destination node is a node inside the host or a node outside the host; and if the destination node is a node inside the host, execute step 103; or if the destination node is a node outside the host, execute step 104.

For example, the data acquired in step 101 may be sent to a back-end virtual NIC inside the physical host; the back-end virtual NIC sends the data to a switching module located inside the physical host (it should be noted that the switching module here is located in a kernel space of the physical host); the switching module determines, according to the data, whether the destination node is a node inside the host or a node outside the host; and if the destination node is a node inside the host, executes step 103; or if the destination node is a node outside the host, executes step 104.

The step of "determining, according to the data, whether the destination node is a node inside the host or a node outside the host" may be implemented using any manner in the following, determining whether the MAC address that is of the destination node and carried in the data exists in a first mapping table; and if yes, determining that the destination node is a node inside the host; or if not, determining that the destination node is a node outside the host; or, searching, according to the MAC address that is of the destination node and carried in the data, a first mapping table for a virtual NIC port corresponding to the MAC address; and if the virtual NIC port corresponding to the MAC address is found, determining that the destination node is a node inside the host; or if the virtual NIC port corresponding to the MAC address is not found, determining that the destination node is a node outside the host.

The first mapping table may include information such as a correspondence between MAC addresses and virtual NIC ports (in_port), for example, the first mapping table may be a mac-port table.

It should be noted that regardless of a similarity that a mapping table, for example, a mac-port table, is maintained in both the switching module and an existing bridge, the switching module is different from the existing Bridge; in the existing Bridge, MAC address learning (MAC-learning) needs to be performed packet by packet, while the virtual NIC port in the first mapping table is generated when a back-end virtual NIC is connected to the host and is deleted when the back-end virtual NIC is removed, so that MAC address learning does not need to be performed; that is, the first mapping table changes only when a back-end virtual NIC is inserted or removed, and MAC address learning does not need to be performed packet by packet.

The MAC address learning refers to generating, by learning every packet that enters a switch, a first mapping table such as a mac-port table for use as a reference for forwarding, and is a basic working principle of a conventional switch.

Correspondingly, the method for switching data between virtual machines of this embodiment of the present disclosure may further include, when it is detected that a back-end virtual NIC is connected to the physical host, generating a corresponding virtual NIC port, and adding, to the first mapping table, the virtual NIC port corresponding to a designated MAC address (for example, when a corresponding virtual NIC port is generated, a MAC address may be designated for the generated virtual NIC port, and a correspondence between the MAC and the generated virtual NIC port is recorded in the first mapping table); and, when it is detected that the back-end virtual NIC is removed from the physical host, deleting, from the first mapping table, the virtual NIC port corresponding to the designated MAC address, that is, deleting the virtual NIC port and the MAC address corresponding to the virtual NIC port, where the virtual NIC port was generated when the back-end virtual NIC was previously connected to the physical host before the back-end virtual NIC is removed.

103. If it is determined in step 102 that the destination node is a node inside the host, determine a destination virtual NIC port, and send the data to a corresponding destination virtual machine using a destination virtual NIC corresponding to the destination virtual NIC port. For example, this step may be as follows.

If it is determined in step 102 whether the destination node is a node inside the host or a node outside the host according to "whether the MAC address of the destination node exists in a first mapping table", in this case, the first mapping table is searched, according to the MAC address that is of the destination node and carried in the data, for a virtual NIC port corresponding to the MAC address; in this embodiment of the present disclosure, the virtual NIC port corresponding to the MAC address is referred to as the destination virtual NIC port; next, the data is sent to the corresponding destination virtual machine according to the destination virtual NIC corresponding to the destination virtual NIC port.

If it is determined in step 102 whether the destination node is a node inside the host or a node outside the host according to "whether the virtual NIC port corresponding to the MAC address can be found in a first mapping table", in this case, the data may be directly sent to the corresponding destination virtual machine according to a virtual NIC corresponding to a found virtual NIC port; that is, in this case, the determining a destination virtual NIC port is determining that the found virtual NIC port corresponding to the MAC address as the destination virtual NIC port.

104. If it is determined in step 102 that the destination node is a node outside the host, determine a physical NIC port (that is, a destination physical NIC port), and send the data outside the physical host using a physical NIC corresponding to the physical NIC port. For example, this step may be as follows.

A virtual NIC port that is used to receive the data is acquired, which is referred to as a source virtual NIC port in this embodiment of the present disclosure, and a second mapping table is searched according to the virtual NIC port that is used to receive the data, to obtain a physical NIC port corresponding to the virtual NIC port. For example, the physical NIC port corresponding to the virtual NIC port may be acquired by searching the second mapping table, and the data is then sent outside the physical host using the physical NIC corresponding to the physical NIC port.

The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

It should be noted that the source virtual NIC port refers to a virtual NIC port that is used to receive data, while the destination virtual NIC port refers to a virtual NIC port that is acquired by searching the first mapping table and corresponds to the MAC address of the destination node (for example, the destination virtual machine) carried in the data; it should be understood that when data is received using the virtual NIC port, the virtual NIC port is a source virtual NIC port, and when data is sent using the virtual NIC port, the virtual NIC port is a destination virtual NIC port; the source virtual NIC port and the destination virtual NIC port may be a same port, or may also be different ports. It should be understood that, in some approaches, both a NIC (including a physical NIC and a virtual NIC) and a NIC port (including a physical NIC port and a virtual NIC port) are bidirectional; a source NIC port and a destination NIC port (for example, a destination physical NIC port or a destination virtual NIC port, where, for ease of description, the destination physical NIC port is referred to as a physical NIC port for short in the embodiments of the present disclosure) are only named for a specific packet (that is, data). For example, when uplink data is received through the NIC port, the NIC port through which the uplink data is received may be referred to as a source NIC port; if the NIC port is a physical NIC port, in this case, the source NIC port is referred to as a source physical NIC port; or if the NIC port is a virtual NIC port, the source NIC port is referred to as a source virtual NIC port. For another example, when downlink data is sent through the NIC port, the NIC port through which the downlink data is sent may be referred to as a destination NIC port; if the NIC port is a physical NIC port, in this case, the destination NIC port is referred to as a destination physical NIC port; or if the NIC port is a virtual NIC port, the destination NIC port is referred to as a destination virtual NIC port, and the like; elaborate description is no longer provided herein.

In addition, it should further be noted that, a physical NIC port is generated when a physical NIC is connected to the physical host, and is deleted when the physical NIC is removed from the physical host. In addition, when a correspondence (or referred to as a mapping relationship) is established between virtual NIC ports and physical NIC ports, a MAC address of a back-end virtual NIC is also delivered into a unicast list of a physical NIC corresponding to the physical NIC port, so that when receiving data, the physical NIC can filter the data.

It can be learned from above that, in this embodiment of the present disclosure, during data switching of a virtual machine, communication between virtual machines inside a host is distinguished from communication between a virtual machine inside a host and a device outside the host. Communication between virtual machines inside a host does not need to pass using a physical NIC, and instead, a destination virtual NIC port is directly determined, and communication is then performed with a destination virtual machine using a destination virtual NIC corresponding to the destination virtual NIC port; that is, this case only involves copying of content between the virtual machines, and therefore, PCI bus bandwidth is not wasted, data switching efficiency can be improved, and communication between another virtual machine inside the host and a device outside the host is also not affected. In the case of communication between a virtual machine inside a host and a device outside the host, a physical NIC port is determined, and communication is then performed with the device outside the physical host using a physical NIC corresponding to the physical NIC port; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, and consumption caused by invalid data is reduced, thereby further improving data switching efficiency.

In addition, because both data receiving and sending of a virtual machine need to be processed by a physical host, it is convenient to provide a further function to the virtual machine inside the host subsequently, for example, access control list (ACL) and flow control functions may be provided to the virtual machine inside the host. That is, the solution can improve data switching efficiency without lowering performance and flexibility of the solution, eliminate, to a certain extent, impact of communication between virtual machines inside a host on communication between another virtual machine inside the host and a device outside the host, and make it convenient to provide a further function to the virtual machine inside the host subsequently, for example, provide the ACL and flow control functions.

Embodiment 2

Embodiment 1 mainly describes a sending procedure in a method for switching data between virtual machines. In addition, the method for switching data between virtual machines may further include a receiving procedure, in other words, the description is made from the perspective of receiving data by a virtual machine inside the physical host described in Embodiment 1 from outside of the host. That is, based on Embodiment 1, the method for switching data between virtual machines may further include receiving data from outside of the physical host using a physical NIC, determining, according to a MAC address that is of a destination node and carried in the data from outside of the physical host, a corresponding destination virtual NIC port, and sending, to a corresponding destination virtual machine, the data from outside of the physical host using a destination virtual NIC corresponding to the destination virtual NIC port.

Figure 2:
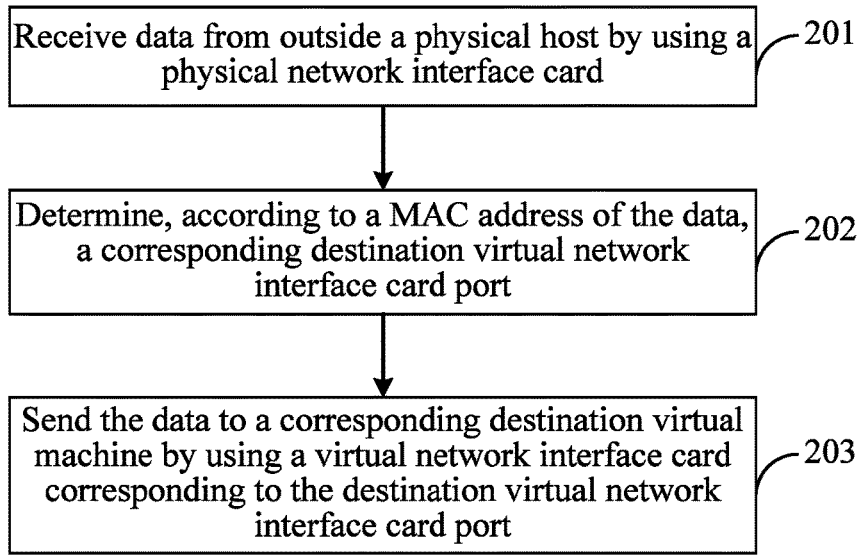
FIG. 2 is another flowchart of a method for switching data between virtual machines according to an embodiment of the present disclosure.

As shown in FIG. 2, the procedure may be as follows.

201. Receive data from outside a physical host using a physical NIC, where a MAC address of a destination node is carried in the data from outside of the physical host.

202. Determine, according to the MAC address that is of the destination node and carried in the data from outside of the physical host, a corresponding destination virtual NIC port. For example, this step may be as follows.

Search, according to the MAC address that is of the destination node and carried in the data from outside of the physical host, a first mapping table for a virtual NIC port corresponding to the MAC address.

The first mapping table may include information such as a correspondence between MAC addresses and virtual NIC ports (in_port), for example, the first mapping table may be a mac-port table.

The virtual NIC port in the first mapping table is generated when a back-end virtual NIC is connected to the host, and is deleted when the back-end virtual NIC is removed; MAC address learning (MAC-learning) may not be performed; the first mapping table changes only when a back-end virtual NIC is inserted or removed, and MAC learning does not need to be performed packet by packet.

In addition, if it is determined that the MAC address that is of the destination node and carried in the data from outside of the physical host does not exist in the first mapping table, the data from outside of the physical host may be directly discarded. That is, after the step of "receiving data from outside a physical host using a physical NIC" (that is, step 201), the method for switching data between virtual machines may further include, when the virtual NIC port corresponding to the MAC address is not found in the first mapping table according to the MAC address that is of the destination node and carried in the data from outside of the physical host, discarding the data from outside of the physical host.

It should be noted that, as described in Embodiment 1, when a correspondence (or referred to as a mapping relationship) is established between virtual NIC ports and physical NIC ports, a MAC address of a back-end virtual NIC may also be delivered into a unicast list of a physical NIC corresponding to the physical NIC port; in this way, in this step (that is, step 202), when receiving data, the physical NIC can filter the data using use the list, so that all data entering the physical host is valid data, and consumption caused by invalid data is reduced.

203. Send, to a corresponding destination virtual machine, the data from outside of the physical host using a destination virtual NIC corresponding to the destination virtual NIC port. For example, this step may be as follows.

The data from outside of the physical host is sent to the corresponding destination virtual machine using the virtual NIC port that is found in step 202 and corresponds to the MAC address.

It can be learned from above that, in this embodiment of the present disclosure, data from outside a host all needs to be received through a physical NIC, so that data entering the physical host may be conveniently controlled. For example, as long as a promiscuous mode is not enabled for the physical NIC, it can be controlled that all data entering the physical host is valid data; consumption caused by invalid data is reduced, and data switching efficiency can be improved. In addition, because the receiving of data by a virtual machine all needs to pass through the physical host, ACL and flow control functions may be provided to the virtual machine inside the host. That is, the solution can improve data switching efficiency without lowering performance and flexibility of the solution, and achieve that the ACL and flow control functions are provided to the virtual machine inside the host.

The methods described according to Embodiment 1 and Embodiment 2 are further described below in detail using examples in Embodiments 3, 4, and 5.

Embodiment 3

In this embodiment, detailed description is made using a physical host as an example.

Figure 3A:
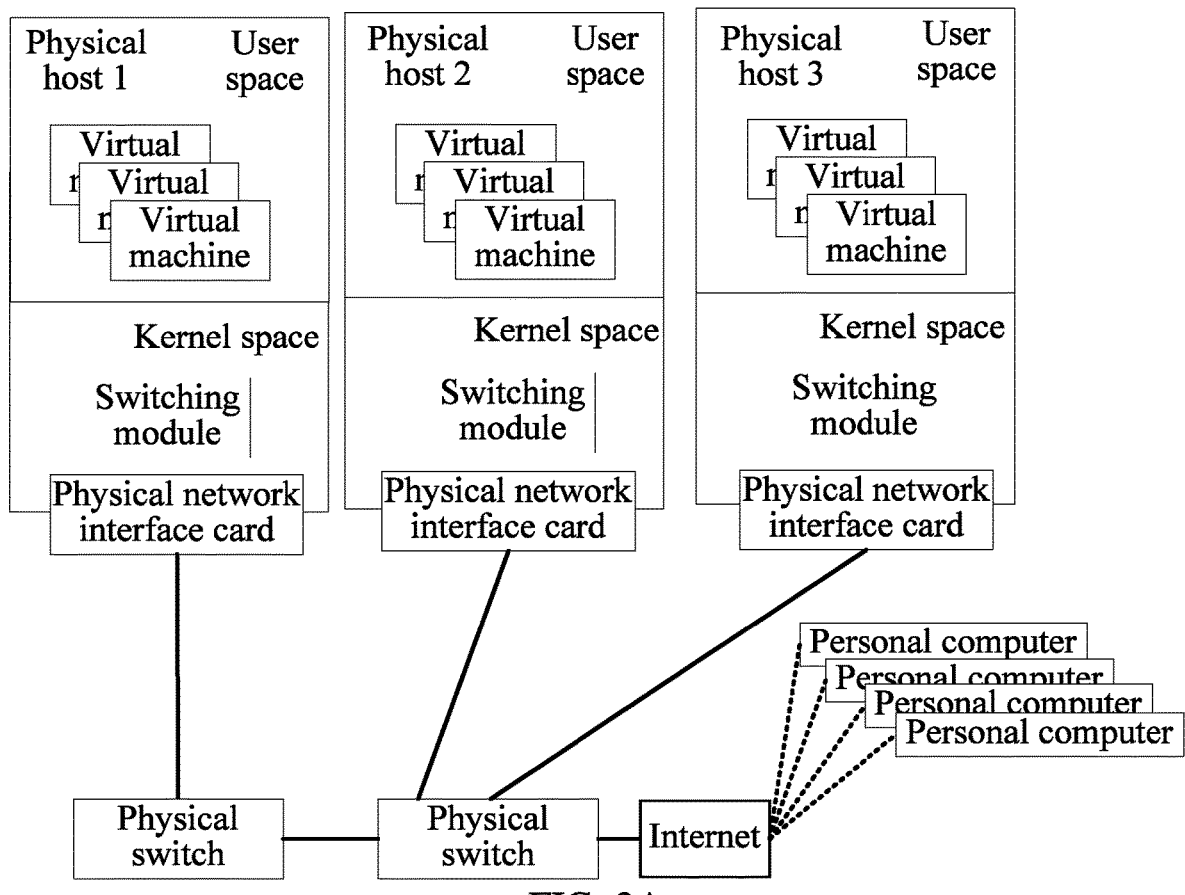
FIG. 3A is a schematic diagram of a scenario for a method for switching data between virtual machines according to an embodiment of the present disclosure.

Referring to FIG. 3A, FIG. 3A is a schematic diagram of a scenario for a method for switching data between virtual machines according to an embodiment of the present disclosure.

The scenario for the method for switching data between virtual machines provided in this embodiment of the present disclosure includes multiple physical hosts, where each physical host includes a hardware layer, a kernel space on the hardware layer, and a user space on the kernel space. The user space includes one or multiple virtual machines. The hardware layer includes a network connection device (that is, a physical NIC), a processor, and a memory (not shown in FIG. 3A), and the like. The kernel space may be understood as a system management layer. The kernel space includes a back-end virtual NIC (not shown in FIG. 3A) and a switching module. Moreover, it should also be understood that each virtual machine may include virtual hardware (for example, a virtual processor and a virtual NIC), a client operating system on the virtual hardware, and an application program on the client operating system. The client operating system may include a driver, for example, a virtual NIC driver. Moreover, the physical host may be connected to a physical switch using the physical NIC, so as to implement a connection to the Internet and implement communication with another physical host in a system.

Figure 3B:
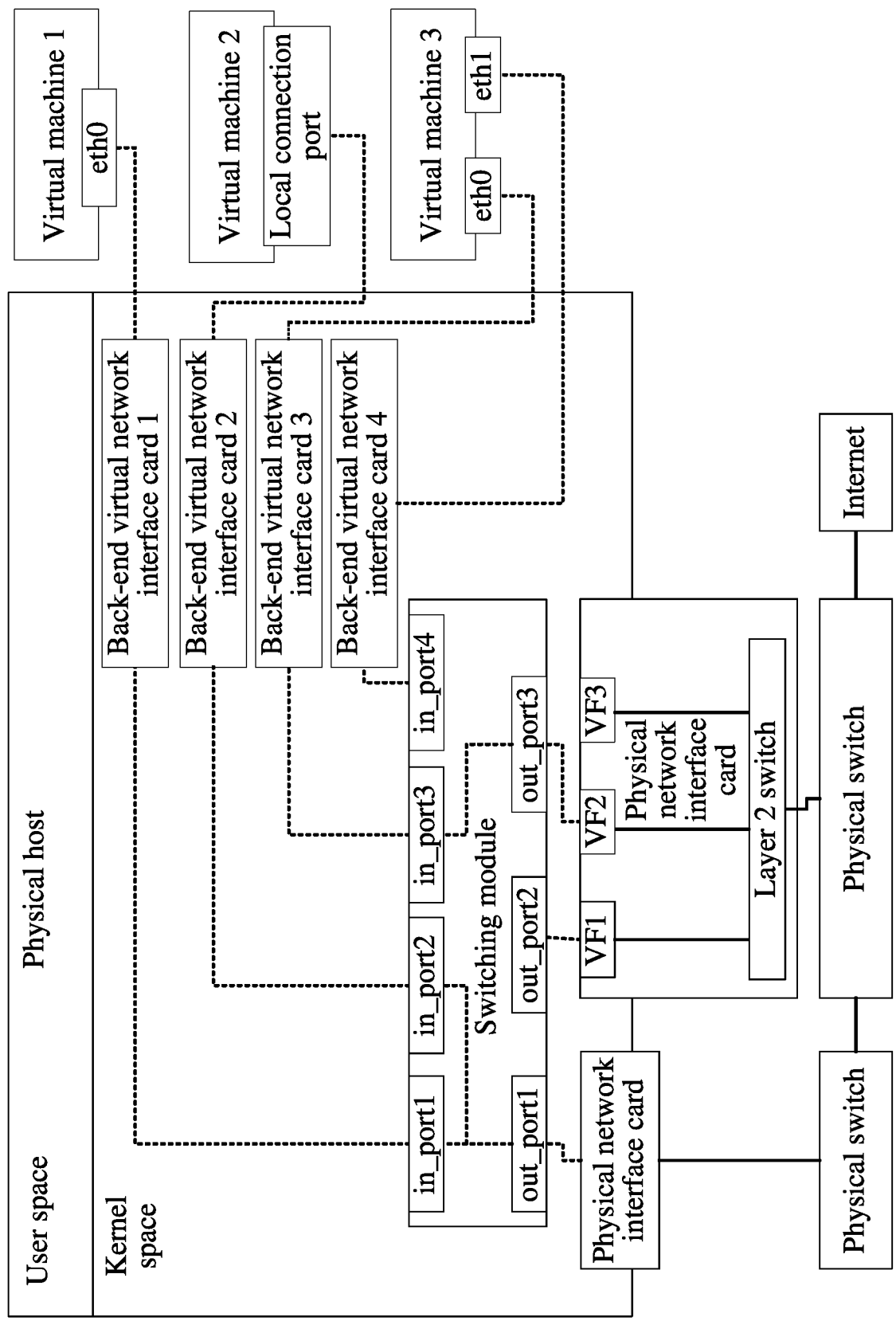
FIG. 3B is a schematic structural diagram of a physical host according to an embodiment of the present disclosure.

Referring to FIG. 3B, FIG. 3B is a schematic structural diagram of a physical host (where, to better describe relationships among members, in addition to the physical host, a physical switch and the Internet are further provided in FIG. 3B).

1. For sending of data by a virtual machine configured to send data (for example, a packet), where, an application in a virtual machine 1 sends a packet, the packet is processed by a client operating system in the virtual machine 1 (which may be understood as a kernel of the virtual machine 1) and is then transferred to a virtual NIC driver in the virtual machine 1, and the virtual NIC driver transfers the processed data to a back-end virtual NIC 1; back-end virtual NIC configured to transfer the received data to a switching module, where in other words, the data passes through the back-end virtual NIC and enters the switching module for processing; switching module referred to as map_switch, configured to receive the data sent by the back-end virtual NIC; determine, according to a MAC address that is of a destination node and carried in the data, whether the destination node is a node inside the host or a node outside the host; and if the destination node is a node inside the host, determine a destination virtual NIC port, and send the data to a corresponding destination virtual machine using a destination virtual NIC corresponding to the destination virtual NIC port; or if the destination node is a node outside the host, determine a physical NIC port, and send, using the physical NIC port, the data to a physical NIC corresponding to the physical NIC port; and physical NIC configured to send the data outside the physical host.

2. In addition, for receiving of data by a virtual machine physical NIC further configured to receive data from outside of the physical host, and transfer the data to the switching module; switching module further configured to receive the data that is sent by the physical NIC and from outside of the physical host, determine, according to a MAC address that is of a destination node and carried in the data, a corresponding destination virtual NIC port, and transfer the data to a corresponding destination virtual NIC (that is, a back-end virtual NIC, for example, a back-end virtual NIC 1) using the destination virtual NIC port; back-end virtual NIC configured to transfer the data to a corresponding destination virtual machine, where, the back-end virtual NIC 1 transfers the data to a virtual NIC driver in the corresponding destination virtual machine, and the virtual NIC driver in the destination virtual machine transfers the data to a client operating system in the destination virtual machine, so that the client operating system in the destination virtual machine transfers the data to a corresponding application in the destination virtual machine for processing.

An SR-IOV physical NIC may be used as the physical NIC, so as to make full use of a multi-channel feature of the SR-IOV physical NIC as a multi-queue NIC, and a built-in L2 switching logic function of the NIC, thereby improving overall performance of the physical host.

Based on the foregoing schematic structural diagram of a physical host, a data switching method for the physical host is described below in detail from two aspects, namely, a sending procedure and a receiving procedure, separately.

(1) Sending procedure.

Figure 3C:
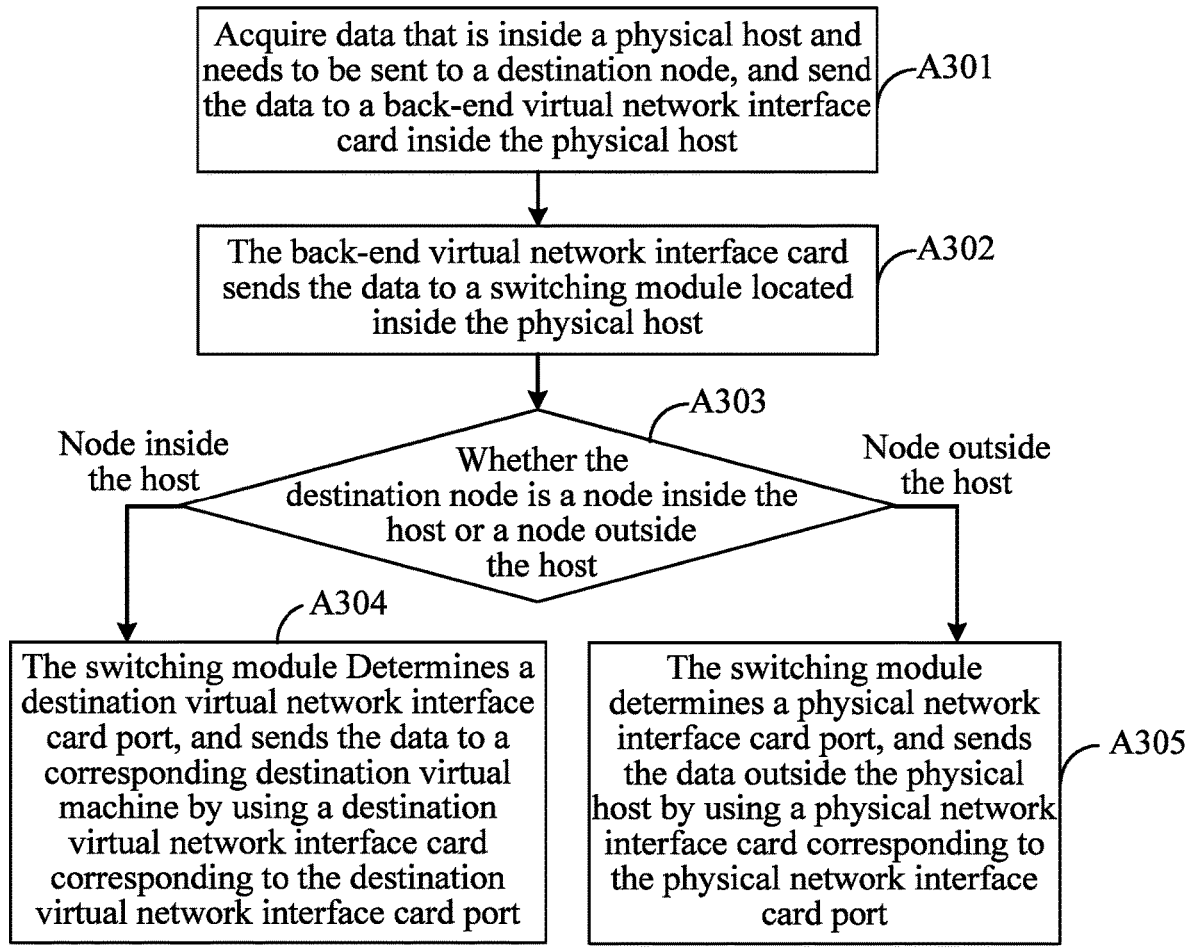
FIG. 3C is a flowchart of sending in a method for switching data between virtual machines according to an embodiment of the present disclosure.

As shown in FIG. 3C, for a method for switching data between virtual machines, a specific procedure may be as follows.

A301. Acquire data that is inside a physical host and needs to be sent to a destination node, and send the data to a back-end virtual NIC inside the physical host. This step may be as follows.

When an application program of a virtual machine starts to send data, the data is acquired, and is processed by a kernel of the virtual machine, the data is then submitted to a virtual NIC driver inside the virtual machine, and the virtual NIC driver sends the data to the back-end virtual NIC inside the physical host.

The destination node may be a node inside the physical host, and is referred to as a node inside the host for short, for example, a virtual machine; or may also be a node outside the physical host, and is referred to as a node outside the host for short, for example, a device outside the host.

A302. The back-end virtual NIC sends the data to a switching module located inside the physical host.

A303. After receiving the data, the switching module determines whether a MAC address that is of the destination node and carried in the data exists in a first mapping table; if it is determined that the MAC address that is of the destination node and carried in the data exists, determines that the destination node is a node inside the host, indicating that current communication is communication inside the host, and executes step A304; if it is determined that the MAC address that is of the destination node and carried in the data does not exist, determines that the destination node is a node outside the host, indicating that current communication is communication outside the host, and executes step A305.

The first mapping table may include information such as a correspondence between MAC addresses and virtual NIC ports (in_port), for example, the first mapping table may be a mac-port table.

It should be noted that the virtual NIC port in the first mapping table is generated when a back-end virtual NIC is connected to the host, and is deleted when the back-end virtual NIC is removed; MAC address learning (MAC-learning) may not be performed; the first mapping table changes only when a back-end virtual NIC is inserted or removed, and MAC address learning does not need to be performed packet by packet. The first mapping table is maintained by the switching module.

It should further be noted that, in addition to the foregoing method, a method as follows may further be used to determine whether the destination node is a node inside the host or a node outside the host.

Search, according to the MAC address that is of the destination node and carried in the data, the first mapping table for a virtual NIC port corresponding to the MAC address; and if the virtual NIC port corresponding to the MAC address is found, determine that the destination node is a node inside the host, and execute step A304; or if the virtual NIC port corresponding to the MAC address is not found, determine that the destination node is a node outside the host, and execute step A305.

A304. If the destination node is a node inside the host, the switching module determines a destination virtual NIC port, and sends the data to a corresponding destination virtual machine using a destination virtual NIC corresponding to the destination virtual NIC port, and the procedure ends. For example, this step may be as follows.

The switching module searches, according to the MAC address that is of the destination node and carried in the data, the first mapping table for a virtual NIC port corresponding to the MAC address (in_port), that is, the destination virtual NIC port, and then sends the data to the corresponding destination virtual machine using the destination virtual NIC corresponding to the destination virtual NIC port.

In addition, if in step A303, a method of "whether the virtual NIC port corresponding to the MAC address can be found in a first mapping table" is used to determine whether the destination node is a node inside the host or a node outside the host, in this case, the data may be directly sent to the corresponding destination virtual machine using the destination virtual NIC corresponding to the found virtual NIC port.

A305. If the destination node is a node outside the host, the switching module determines a physical NIC port (out-_port), and sends the data outside the physical host using a physical NIC corresponding to the physical NIC port, and the procedure ends. For example, this step may be as follows.

The switching module searches a second mapping table to acquire a physical NIC port corresponding to a source virtual NIC port of the data, and then sends the data outside the physical host using a physical NIC corresponding to the physical NIC port.

The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

(2) Receiving procedure.

Figure 3D:
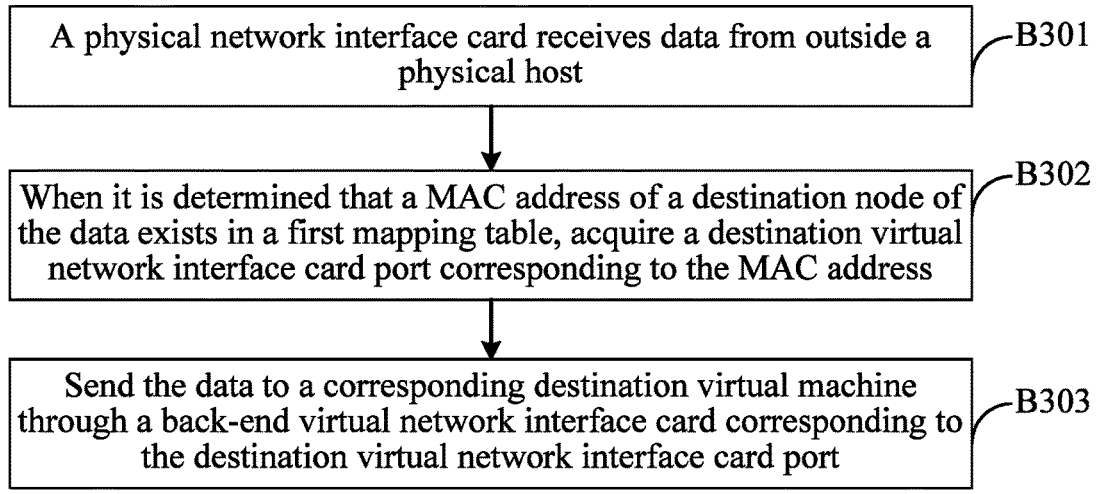
FIG. 3D is a flowchart of receiving in a method for switching data between virtual machines according to an embodiment of the present disclosure.

As shown in FIG. 3D, for a method for switching data between virtual machines, a specific procedure may be as follows.

B301. A physical NIC receives data from outside a physical host.

It should be noted that, optionally, if before B301, a MAC address of a virtual machine has been delivered into a unicast list of the physical NIC, in this case, after receiving the data from outside of the physical host, the physical NIC can filter the data, so that what remains is data whose destination MAC address is a virtual machine inside the physical host, that is, valid data.

B302. The physical NIC sends, to a switching module, the data from outside of the physical host, the switching module determines whether a MAC address that is of a destination node and carried in the data from outside of the physical host exists in a first mapping table, and if the MAC address that is of the destination node and carried in the data from outside of the physical host exists, acquires a virtual NIC port corresponding to the MAC address. For example, this step may be as follows.

After interrupt processing, the physical NIC submits the data (that is, the data from outside of the physical host) to a physical NIC port (where the physical NIC port is located on the switching module) using a physical NIC driver, and the physical NIC port queries the first mapping table, and if the MAC address that is of the destination node and carried in the data is found in the first mapping table, acquires the virtual NIC port corresponding to the MAC address (that is, a destination virtual NIC port).

The first mapping table may include information such as a correspondence between MAC addresses and virtual NIC ports (in_port), for example, the first mapping table may be a mac-port table.

It should be noted that the virtual NIC port in the first mapping table is generated when a back-end virtual NIC is connected to the host, and is deleted when the back-end virtual NIC is removed; MAC address learning (MAC-learning) may not be performed; the first mapping table changes only when a back-end virtual NIC is inserted or removed, and MAC address learning does not need to be performed packet by packet.

In addition, if the physical NIC port determines that the MAC address that is of the destination node and carried in the data from outside of the physical host does not exist in the first mapping table, the data may be directly discarded; certainly, if the data has already been filtered in step B301, generally, all data entering the physical host is valid data, that is, corresponding MAC addresses of all data entering the physical host can be found in the first mapping table.

B303. The switching module sends, to a corresponding destination virtual machine, the data from outside of the physical host using a destination virtual NIC corresponding to the virtual NIC port determined in step B302.

For example, the physical NIC may send, to a back-end virtual NIC corresponding to the virtual NIC port determined in step B302, the data from outside of the physical host, and the back-end virtual NIC then sends, to the destination virtual machine, the data from outside of the physical host.

It can be learned from above that, in this embodiment of the present disclosure, during data switching of a virtual machine, communication between virtual machines inside a host is distinguished from communication between a virtual machine inside a host and a device outside the host. Communication between virtual machines inside a host does not need to pass using a physical NIC, and instead, a destination virtual NIC port is directly determined, and communication is then performed with a destination virtual machine using a destination virtual NIC corresponding to the destination virtual NIC port; that is, this case only involves copying of content between the virtual machines, and therefore, PCI bus bandwidth is not wasted, data switching efficiency can be improved, and communication between another virtual machine inside the host and a device outside the host is also not affected. In the case of communication between a virtual machine inside a host and a device outside the host, a physical NIC port is determined, and communication is then correspondingly performed with the device outside the physical host using the physical NIC port; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, and consumption caused by invalid data is reduced, thereby further improving data switching efficiency.

In addition, because both data receiving and sending of a virtual machine need to be processed a physical host, ACL and flow control functions may be provided to the virtual machine inside the host. That is, the solution can improve data switching efficiency without lowering performance and flexibility of the solution, eliminate, to a certain extent, impact of communication between virtual machines inside a host on communication between another virtual machine inside the host and a device outside the host, and achieve that the ACL and flow control functions are provided to the virtual machine inside the host.

Embodiment 4

According to the method described in Embodiment 3, in this embodiment, an example in which a physical host includes three virtual machines is used for description.

For the specific description of the physical host, reference may be made to Embodiment 3. In this embodiment, the three virtual machines are separately virtual machines of two web servers and a virtual machine of a database server, that is, a virtual machine of a webpage server A, a virtual machine of a webpage server B, and a virtual machine of a database server, where the database server provides services to the two webpage servers. For ease of description, in this embodiment, the virtual machine of the webpage server A is referred to as the webpage server A for short, the virtual machine of the webpage server B is referred to as the webpage server B for short, and the virtual machine of the database server is referred to as the database server for short.

Figure 4A:
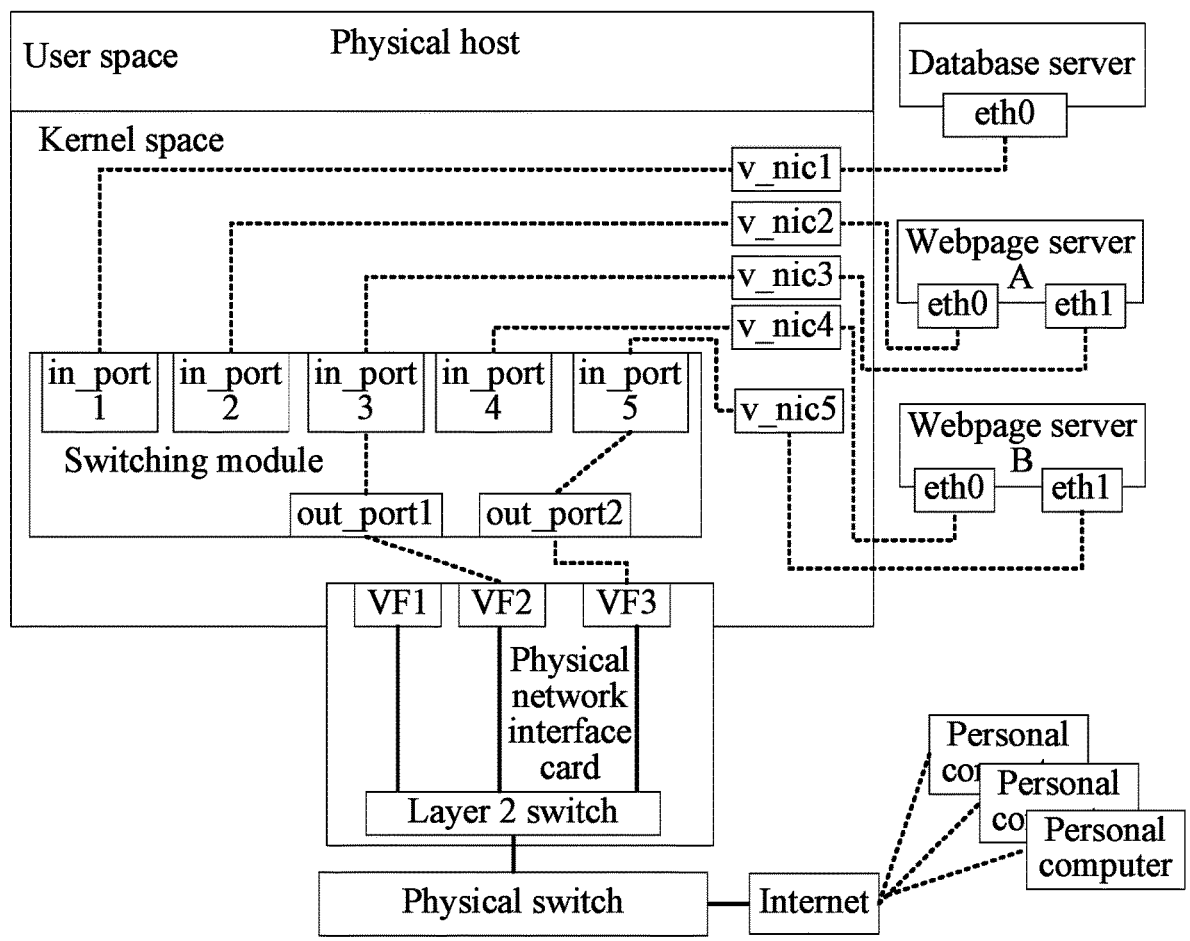
FIG. 4A is a schematic diagram of a scenario when a personal computer accesses a webpage server according to an embodiment of the present disclosure.

Local connection ports eth0 on the two webpage servers and the database server are each connected to a switching module using a virtual NIC; however, no corresponding physical NIC port is designated. Local connection ports eth1 of the two webpage servers are each connected to the switching module using a virtual NIC, and corresponding physical NIC ports are designated. That is, as shown in FIG. 4A, details are as follows.

Two local connection ports eth0 and eth1 of the webpage server A are separately connected to virtual NICs v_nic2 and v_nic3. Two local connection ports eth0 and eth1 of the webpage server B are separately connected to virtual NICs v_nic4 and v_nic5. A local connection port eth0 of the database server is connected to a virtual NIC v_nic1. The virtual NICs v_nic1, v_nic2, v_nic3, v_nic4, and v_nic5 are separately connected to the switching module using a virtual NIC port 1 (in_port1), a virtual NIC port 2 (in_port2), a virtual NIC port 3 (in_port3), a virtual NIC port 4 (in_port4), and a virtual NIC port 5 (in_port5). Corresponding physical NIC ports are separately designated for the virtual NIC port 3 and the virtual NIC port 5, that is, the virtual NIC port 3 corresponds to a physical NIC port 1 (out_port1), and the virtual NIC port 5 corresponds to a physical NIC port 2 (out_port2); moreover, a MAC address of the virtual NIC corresponding to the virtual NIC port 3 and a MAC address of the virtual NIC corresponding to the virtual NIC port 5 are separately delivered to corresponding physical NICs. For example, the physical NIC may be an "SR-IOV" NIC, and in this case, the MAC addresses may be delivered to VFs, where the physical NIC port 1 corresponds to a VF2, and the physical NIC port 2 corresponds to a VF3. In this way, data communication between all virtual machines inside the physical host may avoid passing using a physical NIC; when the webpage server performs communication with a device outside a physical host, the data may also be sent by a respective VF. In addition, when an external user accesses the physical host, data also may be first filtered at a physical NIC and split to the VF2 and the VF3, and the data is then directly sent to corresponding virtual machines at the physical NIC ports.

Figure 4B:
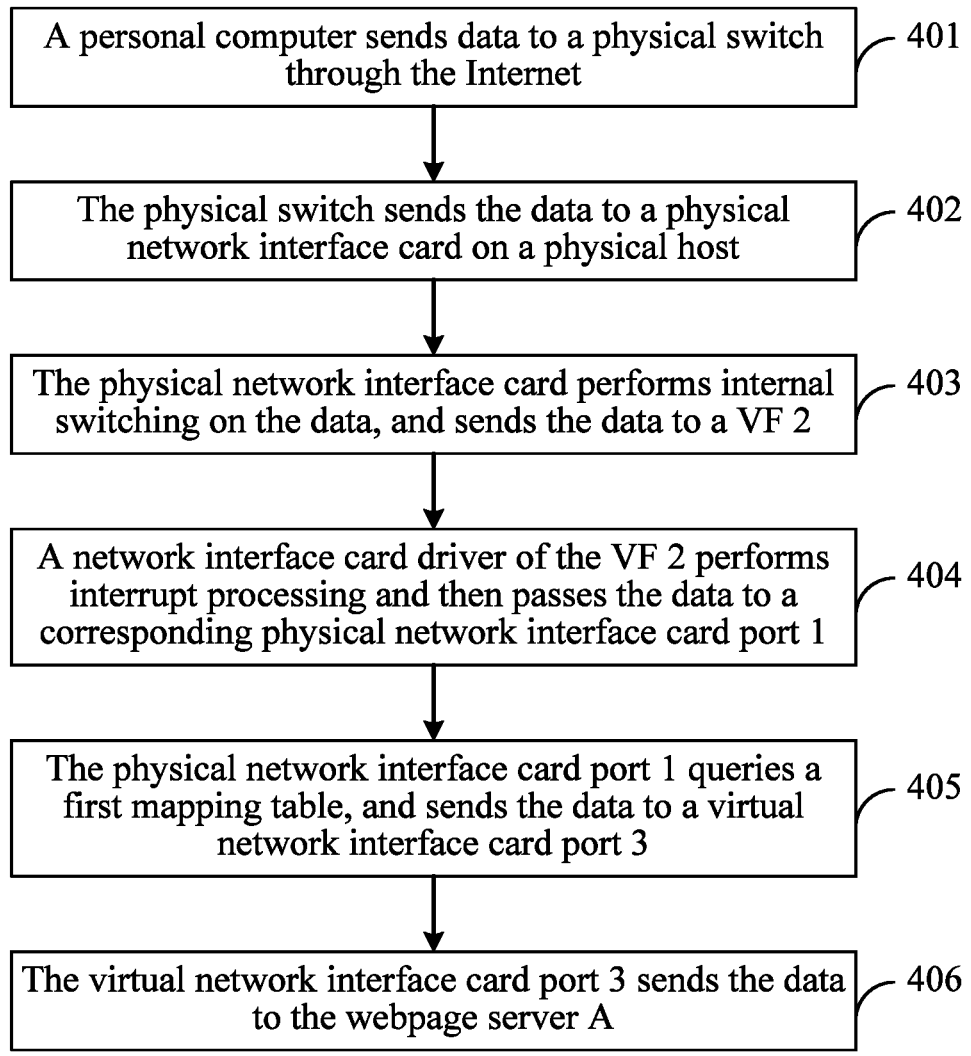
FIG. 4B is a flowchart of a personal computer accessing a webpage server according to an embodiment of the present disclosure.

Using an example in which a personal computer sends data to the webpage server A, as shown in FIG. 4B, a specific procedure of the method for switching data between virtual machines may be as follows.

401. The personal computer sends data to a physical switch through the Internet.

402. The physical switch sends the data to a physical NIC, for example, an "SR-IOV" NIC, on a physical host.

403. The physical NIC performs internal switching on the data, and sends the data to a VF2.

404. A NIC driver of the VF2 performs interrupt processing and then hands the data to a corresponding physical NIC port 1.

405. The physical NIC port 1 queries a first mapping table, finds that a MAC address of a destination node is a virtual NIC port 3, and sends the data to the virtual NIC port 3.

406. Because a virtual NIC corresponding to the virtual NIC port 3 is v_nic3, and a virtual machine corresponding to v_nic3 is the webpage server A, the virtual NIC port 3 sends the data to the webpage server A, and an application program in the webpage server A performs processing.

It can be learned from above that, in this embodiment of the present disclosure, data from outside a physical host needs to be received through a physical NIC (including VFs), so that data entering the physical host can be conveniently controlled. For example, as long as a promiscuous mode is not enabled for the physical NIC, it can be controlled that all data entering the physical host is valid data, consumption caused by invalid data is reduced, and data switching efficiency can be improved. In addition, because the receiving of data by a virtual machine all needs to pass through the physical host, ACL and flow control functions may be provided to the virtual machine inside the host. That is, the solution can improve data switching efficiency without lowering performance and flexibility of the solution, and achieve that the ACL and flow control functions are provided to the virtual machine inside the host.

Embodiment 5

This embodiment is the same as Embodiment 4 in that an example in which the physical host includes three virtual machines is also used for description. For the specific description of the physical host, reference may be made to Embodiment 3. This embodiment is different from Embodiment 4 in that the three virtual machines are a virtual machine of desktop cloud user A, a virtual machine of desktop cloud user B, and a virtual machine of desktop cloud user C, which are referred to as desktop cloud user A, desktop cloud user B, and desktop cloud user C for short.

Figure 5A:
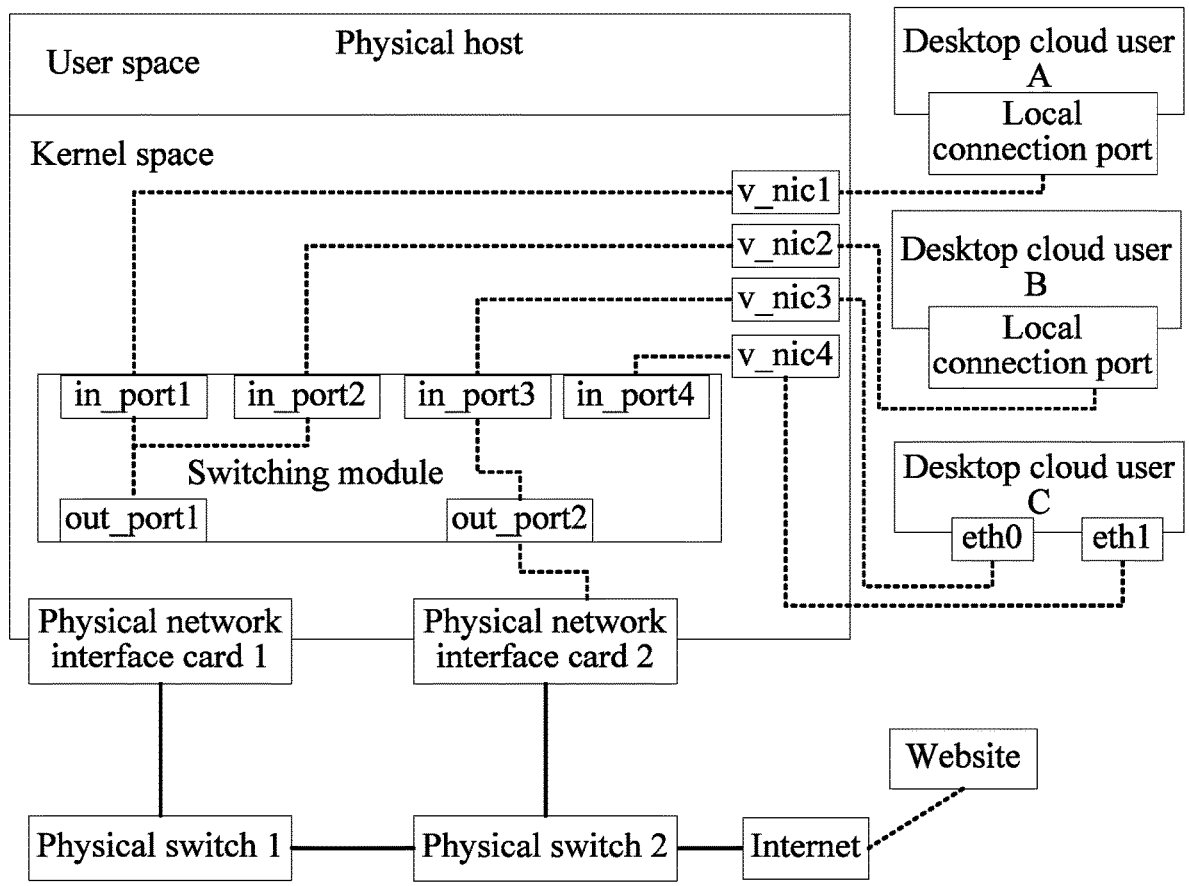
FIG. 5A is a schematic diagram of a scenario in which a cloud desktop user A accesses a website outside a host according to an embodiment of the present disclosure.

A local connection port of desktop cloud user A, a local connection port of desktop cloud user B, and a local connection port eth0 of desktop cloud user C are each connected to a switching module using a virtual NIC, and corresponding physical NIC ports are designated. After a local connection port eth1 of desktop cloud user C is connected to the switching module using a virtual NIC, no corresponding physical NIC port is designated. That is, as shown in FIG. 5A, details are as follows.

A local connection port of desktop cloud user A is connected to a virtual NIC v_nic1, a local connection port of desktop cloud user B is connected to a virtual NIC v_nic2, a local connection port eth0 of desktop cloud user C is connected to a virtual NIC v_nic3, and a local connection port eth1 of desktop cloud user C is connected to a virtual NIC v_nic4. The virtual NICs v_nic1, v_nic2, v_nic3, and v_nic4 are separately connected to the switching module using a virtual NIC port 1 (in_port1), a virtual NIC port 2 (in_port2), a virtual NIC port 3 (in_port3), and a virtual NIC port 4 (in_port4). Corresponding physical NIC ports are separately designated for the virtual NIC port 1, the virtual NIC port 2, and the virtual NIC port 3, that is, the virtual NIC port 1 and the virtual NIC port 2 both correspond to a physical NIC port 1 (out_port1), while the virtual NIC port 3 corresponds to a physical NIC port 2 (out_port2). No corresponding physical NIC port is designated for the virtual NIC port 4.

Figure 5B:
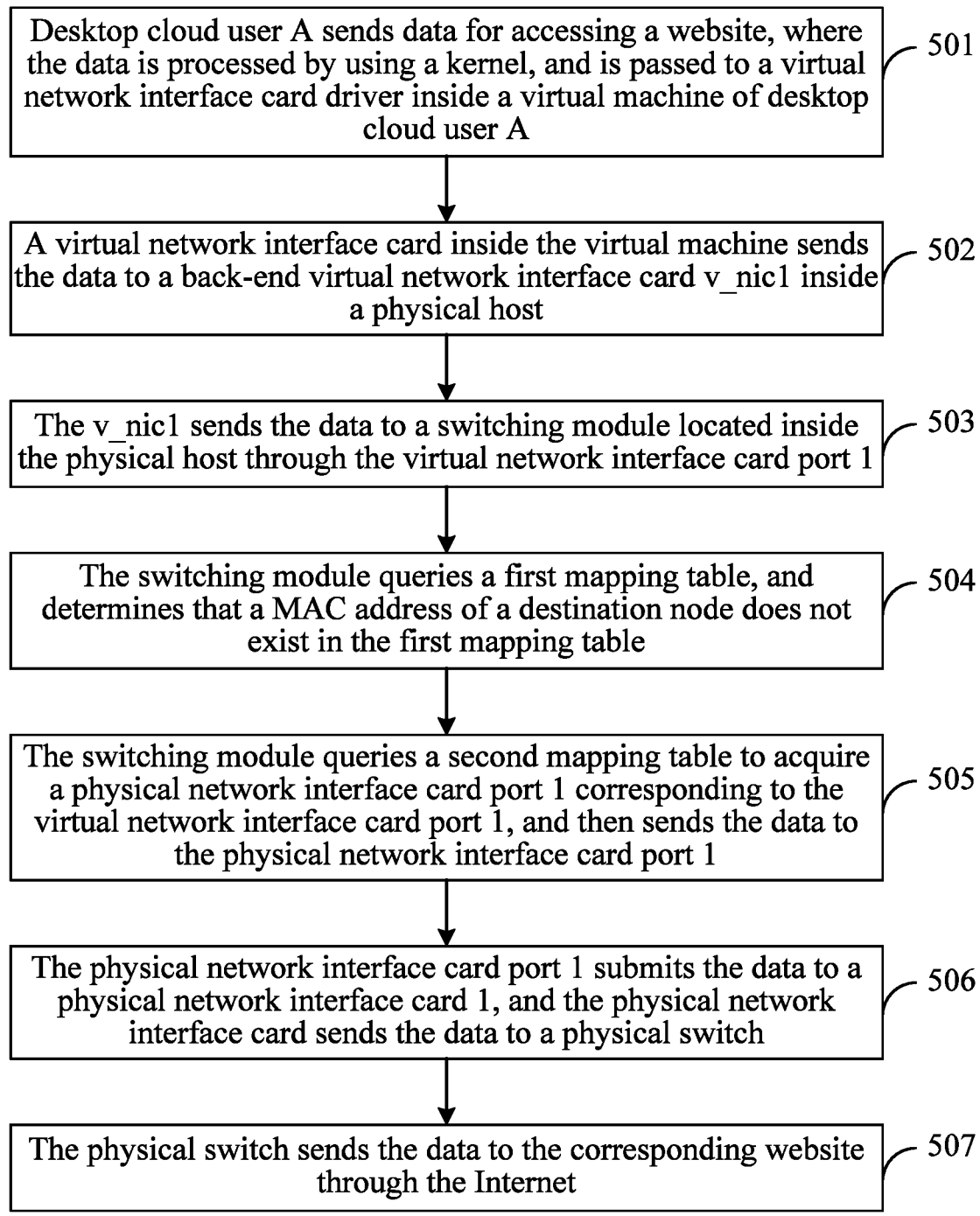
FIG. 5B is a flowchart of a cloud desktop user A accessing a website outside a host according to an embodiment of the present disclosure.

Using an example in which the cloud desktop user A sends data for accessing a website, as shown in FIG. 5B, a specific procedure of the method for switching data between virtual machines may be as follows.

501. Desktop cloud user A sends data for accessing a website, where the data is processed using a kernel, and is handed to a virtual NIC driver inside a virtual machine of desktop cloud user A.

502. A virtual NIC inside the virtual machine sends the data to a back-end virtual NIC v_nic1 inside a physical host.

503. The v_nic1 sends the data to a switching module located inside the physical host using a virtual NIC port 1.

504. After receiving the data, the switching module queries a first mapping table; determines whether a MAC address that is of a destination node and carried in the data exists in the first mapping table, where because the data is sent to a device outside the host, in this case, the MAC address of the destination node is not found in the first mapping table; and executes step 505.

Alternatively, after receiving the data, the switching module may also search, according to the MAC address that is of the destination node and carried in the data, the first mapping table for a virtual NIC port corresponding to the MAC address, where because the data is sent to a device outside the host, in this case, the virtual NIC port corresponding to the MAC address of the destination node is not found in the first mapping table, and execute step 505.

505. The switching module queries a second mapping table to acquire a physical NIC port corresponding to the virtual NIC port 1, that is, a physical NIC port 1, and then sends the data to the physical NIC port 1.

506. The physical NIC port 1 submits the data to a physical NIC 1, and the physical NIC sends the data to a physical switch.

507. The physical switch sends the data to the corresponding website through the Internet.

It can be learned from above that, in this embodiment of the present disclosure, during data switching of a virtual machine, communication between virtual machines inside a host is distinguished from communication between a virtual machine inside a host and a device outside the host. Communication between virtual machines inside a host does not need to pass using a physical NIC, and instead, a destination virtual NIC port is directly determined, and communication is then performed with a destination virtual machine using a destination virtual NIC corresponding to the destination virtual NIC port; that is, this case only involves copying of content between the virtual machines, and therefore, PCI bus bandwidth is not wasted, data switching efficiency can be improved, and communication between another virtual machine inside the host and a device outside the host is also not affected. In the case of communication between a virtual machine inside a host and a device outside the host, a physical NIC port is determined, and communication is then performed with the device outside the physical host using a physical NIC corresponding to the physical NIC port; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, and consumption caused by invalid data is reduced, thereby further improving data switching efficiency.

In addition, because both data receiving and sending of a virtual machine need to be processed by a physical host, it is convenient to provide a further function to the virtual machine inside the host subsequently. For example, ACL and flow control functions may be provided to the virtual machine inside the host. That is, the solution can improve data switching efficiency without lowering performance and flexibility of the solution, eliminate, to a certain extent, impact of communication between virtual machines inside a host on communication between another virtual machine inside the host and a device outside the host, and make it convenient to provide a further function to the virtual machine inside the host subsequently, for example, provide the ACL and flow control functions.

Embodiment 6

Figure 6:
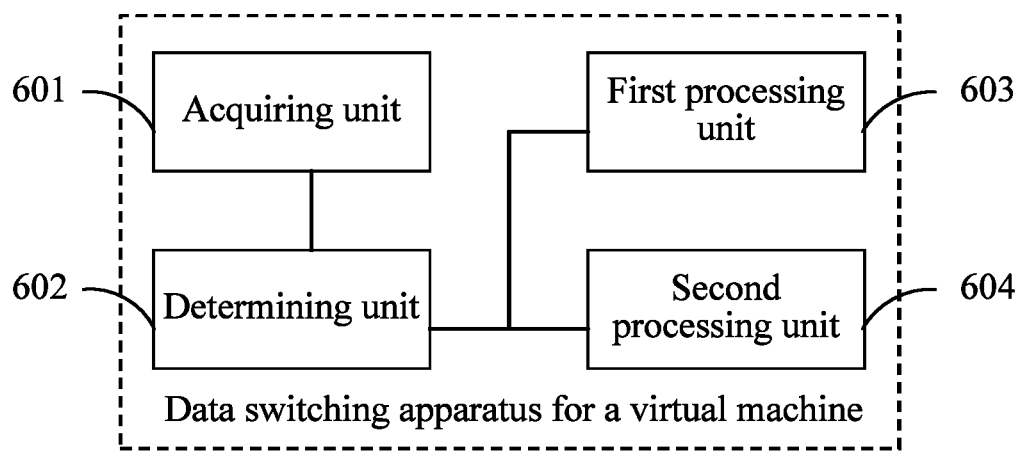
FIG. 6 is a schematic structural diagram of an apparatus for switching data between virtual machines according to an embodiment of the present disclosure.

To better implement the foregoing methods, this embodiment of the present disclosure further provides a apparatus for switching data between virtual machines. As shown in FIG. 6, the apparatus for switching data between virtual machines includes an acquiring unit 601, a determining unit 602, a first processing unit 603, and a second processing unit 604.

The acquiring unit 601 is configured to acquire data that is inside a physical host and needs to be sent to a destination node, where a MAC address of the destination node is carried in the data.

The destination node may be a node inside the physical host, and is referred to as a node inside the host for short, for example, a virtual machine; or may also be a node outside the physical host, and is referred to as a node outside the host for short, for example, a device outside the host.

The determining unit 602 is configured to determine, according to the MAC address that is of the destination node and carried in the data acquired by the acquiring unit 601, whether the destination node is a node inside the host or a node outside the host.

The first processing unit 603 is configured to, when the determining unit 602 determines that the destination node is a node inside the host, determine a destination virtual NIC port, and send the data to a corresponding destination virtual machine using a destination virtual NIC corresponding to the destination virtual NIC port.

The second processing unit 604 is configured to, when the determining unit 602 determines that the destination node is a node outside the host, determine a physical NIC port, and send the data outside the physical host using a physical NIC corresponding to the physical NIC port.

The determining unit 602 may be configured to send the data to a back-end virtual NIC inside the physical host, send the data to a switching module located inside the physical host using the back-end virtual NIC, and determine, using the switching module according to the data, whether the destination node is a node inside the host or a node outside the host.

In this case, the first processing unit 603 may be configured to, when the determining unit 602 determines that the destination node is a node inside the host, determine the destination virtual NIC port using the switching module, and send the data to the corresponding destination virtual machine using the switching module using the destination virtual NIC corresponding to the destination virtual NIC port.

The second processing unit 604 may be configured to, when the determining unit 602 determines that the destination node is a node outside the host, determine the physical NIC port using the switching module, and send the data outside the physical host using the physical NIC corresponding to the physical NIC port.

For example, the determining unit 602 may be configured to determine whether the MAC address that is of the destination node and carried in the data exists in a first mapping table, and if the MAC address that is of the destination node and carried in the data exists, determine that the destination node is a node inside the host, or if the MAC address that is of the destination node and carried in the data does not exist, determine that the destination node is a node outside the host.

In this case, the first processing unit 603 may be configured to, when the determining unit 602 determines that the destination node is a node inside the host, search, according to the MAC address that is of the destination node and carried in the data, the first mapping table for a virtual NIC port corresponding to the MAC address, that is, the destination virtual NIC port, and send the data to the corresponding destination virtual machine using the virtual NIC corresponding to the destination virtual NIC port.

Alternatively, for another example, the determining unit 602 may be configured to search, according to the MAC address that is of the destination node and carried in the data, the first mapping table for a virtual NIC port corresponding to the MAC address; and if the virtual NIC port corresponding to the MAC address is found, determine that the destination node is a node inside the host; or if the virtual NIC port corresponding to the MAC address is not found, determine that the destination node is a node outside the host.

In this case, the first processing unit 603 may be configured to, when the determining unit 602 determines that the destination node is a node inside the physical host, determine that the found virtual NIC port corresponding to the MAC address is the destination virtual NIC port.

The first processing unit 603 may be configured to, when the determining unit 602 determines that the destination node is a node inside the host, determine that the found virtual NIC port corresponding to the MAC address is the destination virtual NIC port, and send the data to the corresponding destination virtual machine using the destination virtual NIC corresponding to the destination virtual NIC port.

The first mapping table may include information such as a correspondence between MAC addresses and virtual NIC ports (in_port), for example, the first mapping table may be a mac-port table.

It should be noted that, the virtual NIC port in the first mapping table is generated when a back-end virtual NIC is connected to the host, and is deleted when the back-end virtual NIC is removed; MAC address learning (MAC-learning) may not be performed, the first mapping table changes only when a back-end virtual NIC is inserted or removed, and MAC address learning does not need to be performed packet by packet. That is, the apparatus for switching data between virtual machines may further include a detecting unit.

The detecting unit is configured to, when it is detected that a back-end virtual NIC is connected to the physical host, generate a corresponding virtual NIC port, and add, to the first mapping table, the virtual NIC port corresponding to a designated MAC address; and, when it is detected that the back-end virtual NIC is removed from the physical host, delete, from the first mapping table, the virtual NIC port corresponding to the designated MAC address.

Optionally, the second processing unit 604 may be configured to, when the determining unit 602 determines that the destination node is a node outside the host, acquire a source virtual NIC port of the data, search a second mapping table according to the source virtual NIC port for a physical NIC port corresponding to the source virtual NIC port, and send the data outside the physical host using a physical NIC corresponding to the physical NIC port.

The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

In addition, it should be noted that, a physical NIC port is generated when a physical NIC is connected to the physical host, and is deleted when the physical NIC is removed from the physical host. In addition, when a correspondence (or referred to as a mapping relationship) is established between virtual NIC ports and physical NIC ports, a MAC address of a back-end virtual NIC is also delivered into a unicast list of a physical NIC corresponding to the physical NIC port, so that when receiving data, the physical NIC can filter the data.

During specific implementation, the various units in the foregoing may be implemented as independent entities, or may also be randomly combined to be implemented as one or several entities. For example, the apparatus for switching data between virtual machines may be a device such as a physical host, and for the structure of the physical host, reference may be made to the content described above, and elaborate description is no longer provided herein. For specific implementation of the various units in the foregoing, reference may be made to the foregoing embodiments, and elaborate description is no longer provided herein.

It can be learned from above that, in this embodiment of the present disclosure, for the apparatus for switching data between virtual machines, during data switching of a virtual machine, communication between virtual machines inside a host is distinguished from communication between a virtual machine inside a host and a device outside the host. Communication between virtual machines inside a host does not need to pass using a physical NIC, and instead, a first processing unit 603 directly determines a destination virtual NIC port, and communication is then performed with a destination virtual machine using a destination virtual NIC corresponding to the destination virtual NIC port; that is, this case only involves copying of content between the virtual machines, and therefore, PCI bus bandwidth is not wasted, data switching efficiency can be improved, and communication between another virtual machine and a device which is outside the host is also not affected. In the case of communication between a virtual machine inside a host and a device outside the host, a second processing unit 604 needs to determine a physical NIC port, and communication is then performed with the device outside the physical host using a physical NIC corresponding to the physical NIC port; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, and consumption caused by invalid data is reduced, thereby further improving data switching efficiency.

In addition, because both data receiving and sending of a virtual machine need to be processed by a physical host, ACL and flow control functions may be provided to the virtual machine inside the host. That is, the solution can improve data switching efficiency without lowering performance and flexibility of the solution, eliminate, to a certain extent, impact of communication between virtual machines inside a host on communication between another virtual machine inside the host and a device outside the host, and achieve that the ACL and flow control functions are provided to the virtual machine inside the host.

Embodiment 7

Figure 7:
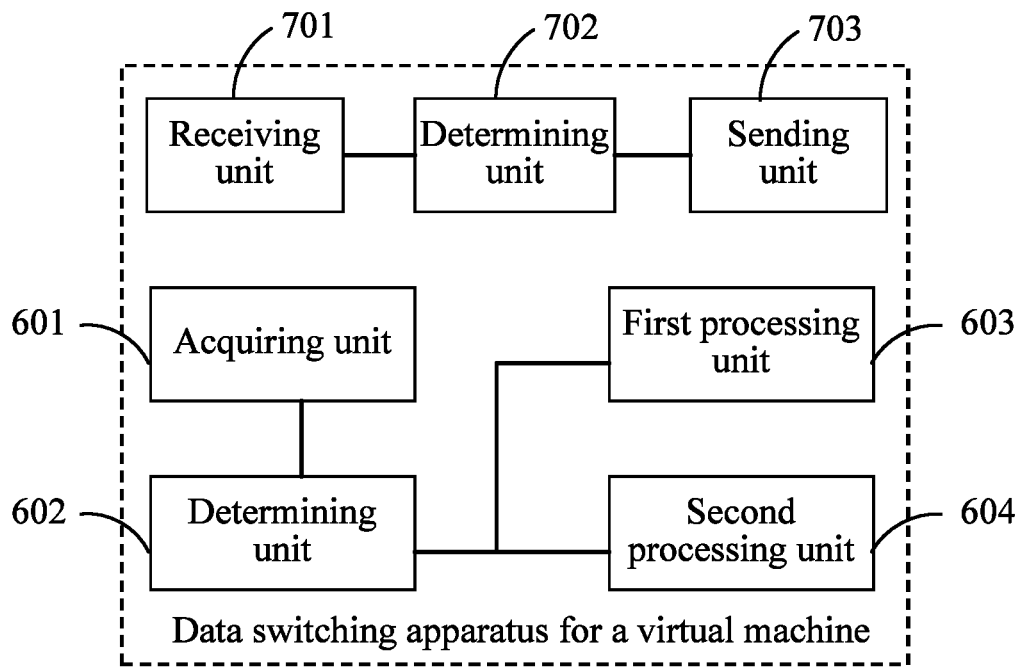
FIG. 7 is a schematic structural diagram of another apparatus for switching data between virtual machines according to an embodiment of the present disclosure.

In addition to sending data, the apparatus for switching data between virtual machines may further be configured to receive data from outside a physical host. Based on Embodiment 6, as shown in FIG. 7, the apparatus for switching data between virtual machines may further include a receiving unit 701, a determining unit 702, and a sending unit 703.

The receiving unit 701 is configured to receive data from outside of the physical host using a physical NIC, where a MAC address of a destination node is carried in the data from outside of the physical host.

The determining unit 702 is configured to determine, according to the MAC address that is of the destination node and carried in the data received by the receiving unit 701, a corresponding destination virtual NIC port.

The sending unit 703 is configured to send the data to a corresponding destination virtual machine using a virtual NIC corresponding to the destination virtual NIC port.

For example, the found virtual NIC port may be used to determine a corresponding back-end virtual NIC, and the data is sent to the destination virtual machine through the determined back-end virtual NIC.

The determining unit 702 may be configured to search, according to the MAC address that is of the destination node and carried in the data from outside of the physical host, a first mapping table for the virtual NIC port corresponding to the MAC address, that is, the destination virtual NIC port.

The first mapping table may include information such as a correspondence between MAC addresses and virtual NIC ports (in_port), for example, the first mapping table may be a mac-port table.

The virtual NIC port in the first mapping table is generated when a back-end virtual NIC is connected to the host, and is deleted when the back-end virtual NIC is removed; MAC address learning (MAC-learning) may not be performed, the first mapping table changes only when a back-end virtual NIC is inserted or removed, and MAC address learning does not need to be performed packet by packet.

In addition, if the physical NIC determines that the MAC address that is of the destination node and carried in the data does not exist in the first mapping table, the data may be directly discarded.

The determining unit 702 may further be configured to, when the virtual NIC port corresponding to the MAC address is not found in the first mapping table according to the MAC address that is of the destination node and carried in the data from outside of the physical host, discard the data from outside of the physical host.

During specific implementation, the various units in the foregoing may be implemented as independent entities, or may also be randomly combined to be implemented as one or several entities. For example, the apparatus for switching data between virtual machines may be a device such as a physical host, and the physical host may include devices such as a processor, a physical NIC, and a virtual machine. For specific implementation of the various units in the foregoing, reference may be made to the foregoing embodiments, and elaborate description is no longer provided herein.

It can be seen from above that, in this embodiment of the present disclosure, for the apparatus for switching data between virtual machines, data from outside a host all needs to be received through a physical NIC, so that data entering a physical host may be conveniently controlled. For example, as long as a promiscuous mode is not enabled for the physical NIC, it can be controlled that all data entering the physical host is valid data, consumption caused by invalid data is reduced, and data switching efficiency can be improved. In addition, because the receiving of data by a virtual machine all needs to pass through the physical host, ACL and flow control functions may be provided to the virtual machine inside the host. That is, the solution can improve data switching efficiency without lowering performance and flexibility of the solution, and achieve that the ACL and flow control functions are provided to the virtual machine inside the host.

Embodiment 8

Figure 10:
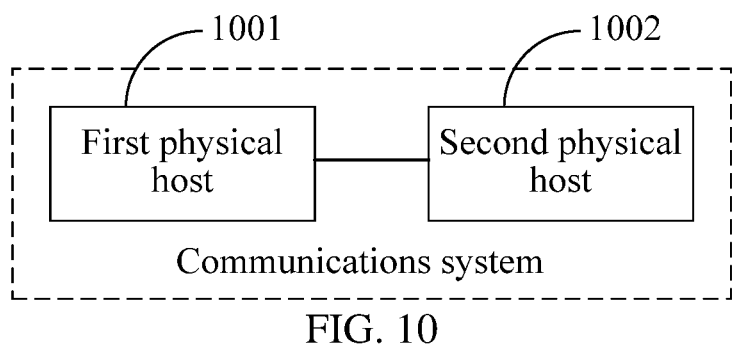
FIG. 10 is a schematic structural diagram of a communications system according to an embodiment of the present disclosure.

Correspondingly, this embodiment of the present disclosure further provides a communications system. As shown in FIG. 10, the communications system includes at least two physical hosts, where the at least two physical hosts include a first physical host 1001 and a second physical host 1002.

The first physical host 1001 is configured to acquire data that is inside the physical host (that is, the first physical host 1001) and needs to be sent to a destination node, where a MAC address of the destination node is carried in the data; determine, according to the MAC address that is of the destination node and carried in the data, whether the destination node is a node inside the physical host or a node outside the physical host; and if the destination node is a node inside the physical host, determine a destination virtual NIC port, and send the data to a corresponding destination virtual machine using a virtual NIC corresponding to the destination virtual NIC port; or if the destination node is a node outside the physical host, determine a physical NIC port, and send the data to the corresponding second physical host 1002 using a physical NIC corresponding to the physical NIC port.

The second physical host 1002 is configured to receive the data sent by the first physical host 1001.

For example, the first physical host 1001 may be configured to acquire the data that is inside the physical host (that is, the first physical host 1001) and needs to be sent to the destination node; determine whether the MAC address that is of the destination node and carried in the data exists in a first mapping table; and if the MAC address that is of the destination node and carried in the data exists in the first mapping table, determine that the destination node is a node inside the physical host (that is, the first physical host), search, according to the MAC address that is of the destination node and carried in the data, the first mapping table for a virtual NIC port corresponding to the MAC address, that is, the destination virtual NIC port, and send the data to the corresponding destination virtual machine using the virtual NIC corresponding to the destination virtual NIC port; or if the MAC address that is of the destination node and carried in the data does not exist in the first mapping table, determine that the destination node is a node outside the host, determine the physical NIC port, and send the data to the second physical host 1002 using the physical NIC corresponding to the physical NIC port.

Alternatively, for another example, the first physical host 1001 may be configured to search, according to the MAC address that is of the destination node and carried in the data, a first mapping table for a virtual NIC port corresponding to the MAC address, and if the virtual NIC port corresponding to the MAC address (that is, the destination virtual NIC port) is found, determine that the destination node is a node inside the physical host (the first physical host 1001), determine that the found virtual NIC port corresponding to the MAC address is the destination virtual NIC port, and send the data to the corresponding destination virtual machine using the virtual NIC corresponding to the destination virtual NIC port; or if the virtual NIC port corresponding to the MAC address is not found, determine that the destination node is a node outside the host, determine the physical NIC port, and send the data to the second physical host 1002 using the physical NIC corresponding to the physical NIC port.

The first mapping table may include information such as a correspondence between MAC addresses and virtual NIC ports, for example, the first mapping table may be a mac-port table.

Optionally, the first physical host 1001 may be configured to acquire a source virtual NIC port of the data, search a second mapping table according to the source virtual NIC port carried in the data to obtain a physical NIC port corresponding to the source virtual NIC port, and send the data outside the first physical host 1001 using a physical NIC corresponding to the physical NIC port.

The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

It should be understood that, the second physical host 1002 may further be configured to send data to the first physical host.

Correspondingly, the first physical host 1001 may further be configured to receive data from the second physical host 1002 using a physical NIC, where a MAC address of a destination node is carried in the data from the second physical host 1002; determine, according to the MAC address that is of the destination node and carried in the data from the second physical host 1002, a corresponding destination virtual NIC port inside the physical host (that is, the first physical host 1001); and send, to a corresponding destination virtual machine using a virtual NIC corresponding to the destination virtual NIC port, the data from the second physical host 1002. For example, the first physical host 1001 may be as follows.

The first physical host 1001 may be configured to search, according to the MAC address that is of the destination node and carried in the data from the second physical host 1002, the first mapping table for a virtual NIC port corresponding to the MAC address, that is, the destination virtual NIC port, and send, to the corresponding destination virtual machine using the virtual NIC corresponding to the destination virtual NIC port, the data from the second physical host 1002.

In addition, the first physical host 1001 may further be configured to, when the virtual NIC port corresponding to the MAC address is not found in the first mapping table according to the MAC address that is of the destination node and carried in the data from the second physical host 1002, discard the data from the second physical host 1002.

It should be understood that, in an implementation manner, any apparatus for switching data between virtual machines provided in the embodiments of the present disclosure is integrated inside the physical host; for details, reference may be made to Embodiment 6 and Embodiment 7, and elaborate description is no longer provided herein. For specific implementation of any device in the foregoing, reference may be made to the foregoing embodiments, and elaborate description is no longer provided herein.

In addition, the communications system may further include other devices, that is, other devices outside the physical host, for example, a physical switch, other servers and/or personal computers, and elaborate description is no longer provided herein.

The communications system may also achieve beneficial effects of the apparatuses for switching data between virtual machines described in Embodiment 6 and Embodiment 7, and elaborate description is no longer provided herein.

Embodiment 9

Figure 8A:
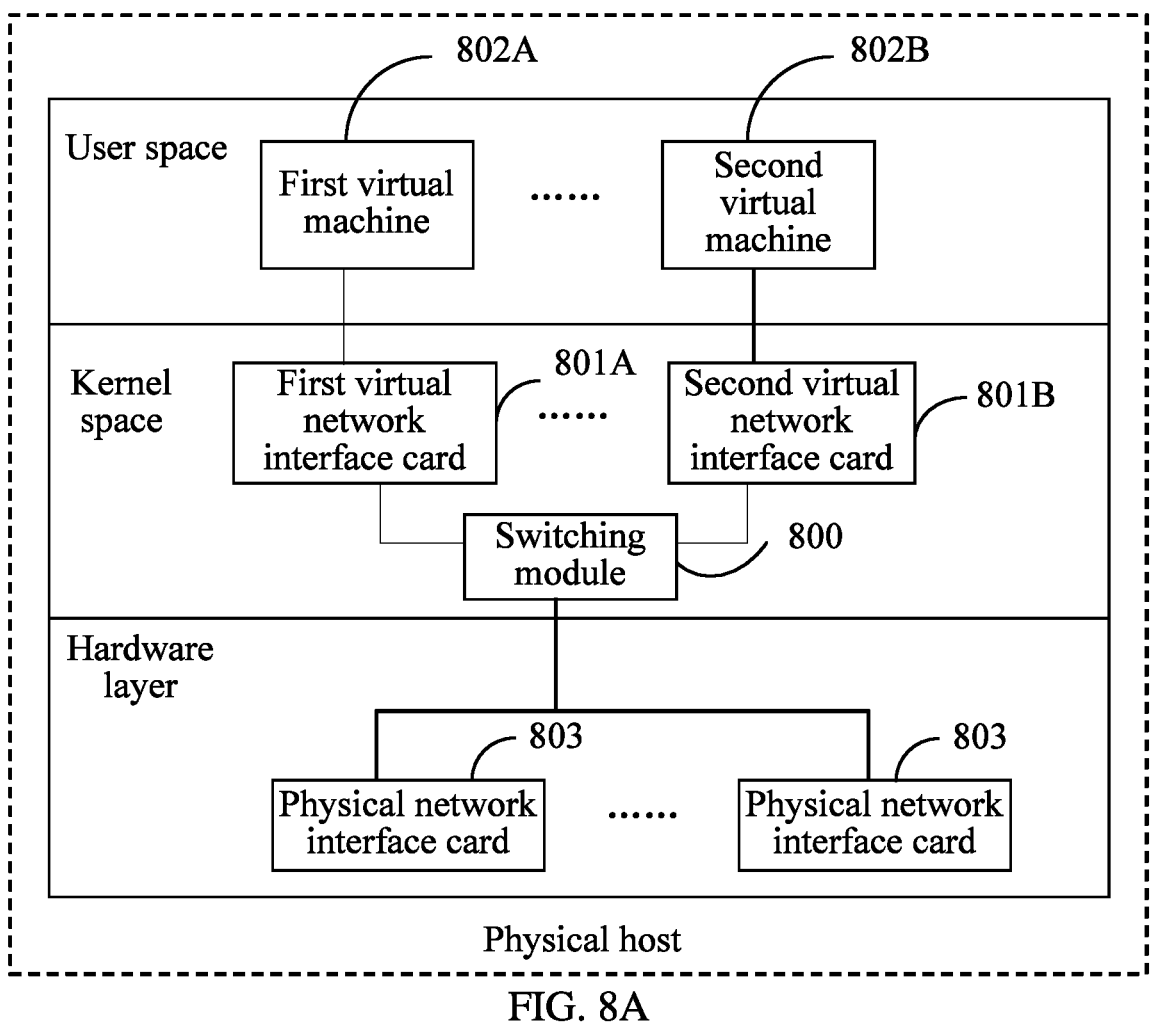
FIG. 8A is a schematic structural diagram of a physical host according to an embodiment of the present disclosure.

Correspondingly, this embodiment of the present disclosure further provides a physical host. As shown in FIG. 8A, the physical host includes at least one virtual machine, for example, a first virtual machine 802A and a second virtual machine 802B (only exemplary, and the number is not limited), located in a user space of the physical host, a switching module 800 and at least one virtual NIC, for example, a first virtual NIC 801A and a second virtual NIC 801B (only exemplary, and the number is not limited), located in a kernel space of the physical host, and at least one physical NIC 803 (only exemplary, and the number is not limited) located in a hardware layer of the physical host.

The first virtual machine 802A is configured to send data that needs to be sent to a destination node, where a MAC address of the destination node is carried in the data.

An application in the first virtual machine 802A sends data, where the data is processed by a client operating system in the first virtual machine 802A (which may be understood as a kernel of the first virtual machine 802A) and is then transferred to a virtual NIC driver in the first virtual machine 802A, and the virtual NIC driver transfers the processed data to the first virtual NIC 801A.

The first virtual NIC 801A is configured to transfer the data to the switching module 800. In other words, the data enters the switching module 800 through the first virtual NIC 801A for processing.

The switching module 800 is configured to determine, according to the MAC address that is of the destination node and carried in the data, whether the destination node is a node inside the host or a node outside the host; and if the destination node is a node inside the host, determine a destination virtual NIC port, and transfer the data to a corresponding destination virtual NIC using the destination virtual NIC port; or if the destination node is a node outside the host, determine a physical NIC port, and transfer, using the physical NIC port, the data to a physical NIC corresponding to the physical NIC port.

It should be noted that the destination virtual NIC here may be, for example, the second virtual NIC 801B. A destination virtual machine here may be, for example, the second virtual machine 802B. The physical NIC here may be, for example, a physical NIC 803.

The second virtual NIC 801B is configured to transfer the data to the corresponding destination virtual machine, for example, the second virtual machine 802B.

The physical NIC 803 is configured to send the data outside the physical host.

In an implementation manner, the switching module 800 may be configured to determine whether the MAC address that is of the destination node and carried in the data exists in a first mapping table; and if yes, determine that the destination node is a node inside the host, search, according to the MAC address that is of the destination node and carried in the data, the first mapping table for the destination virtual NIC port corresponding to the MAC address, and transfer the data to the corresponding destination virtual NIC, for example, the second virtual NIC 801B, using the destination virtual NIC port; or if not, determine that the destination node is a node outside the host, determine the physical NIC port, and transfer, using the physical NIC port, the data to the physical NIC 803 corresponding to the physical NIC port.

Alternatively, the switching module 800 may be configured to search, according to the MAC address that is of the destination node and carried in the data, a first mapping table for a virtual NIC port corresponding to the MAC address (that is, the destination virtual NIC port); and if the virtual NIC port corresponding to the MAC address is found, determine that the destination node is a node inside the host, determine that the found virtual NIC port corresponding to the MAC address is the destination virtual NIC port, and transfer the data to the corresponding destination virtual NIC, for example, the second virtual NIC 801B, using the destination virtual NIC port; or if the virtual NIC port corresponding to the MAC address is not found, determine that the destination node is a node outside the host, determine the physical NIC port, and transfer the data to the corresponding physical NIC 803 using the physical NIC port.

A second mapping table may be searched according to a source virtual NIC port carried in the data to obtain a physical NIC port corresponding to the source virtual NIC port.

The switching module 800 may be configured to, when it is determined that the destination node is a node outside the host, acquire a virtual NIC port (also referred to as a source virtual NIC port) used to receive the data, search the second mapping table according to the source virtual NIC port carried in the data to obtain a physical NIC port corresponding to the source virtual NIC port, and transfer, using the physical NIC port, the data to the physical NIC 803 corresponding to the physical NIC port.

The first mapping table may include information such as a correspondence between MAC addresses and virtual NIC ports (in_port), for example, the first mapping table may be a mac-port table. The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

It should be noted that the destination virtual NIC port in the first mapping table is generated when a virtual NIC (a back-end virtual NIC) is connected to the host, and is deleted when the back-end virtual NIC is removed; MAC address learning (MAC-learning) may not be performed, the first mapping table changes only when a back-end virtual NIC is inserted or removed, and MAC address learning does not need to be performed packet by packet. A physical NIC port is generated when a physical NIC 803 is connected to the physical host, and is deleted when the physical NIC 803 is removed from the physical host.

In addition, it should further be noted that, a physical NIC port is generated when a physical NIC 803 is connected to the physical host, and is deleted when the physical NIC 803 is removed from the physical host. In addition, when a correspondence (or referred to as a mapping relationship) is established between virtual NIC ports and physical NIC ports, a MAC address of a back-end virtual NIC is also delivered into a unicast list of a physical NIC corresponding to the physical NIC port, so that when receiving data, the physical NIC 803 can filter the data.

In addition, for receiving of data by the first virtual machine 802A.

The physical NIC 803 is further configured to receive data from outside of the physical host, where a MAC address of a destination node is carried in the data from outside of the physical host, and transfer, to the switching module 800, the data from outside of the physical host.

The switching module 800 is further configured to receive the data that is sent by the physical NIC 803 and is from outside of the physical host, determine, according to the MAC address that is of the destination node and carried in the data, a corresponding destination virtual NIC port, and transfer the data to a corresponding destination virtual NIC using the destination virtual NIC port. It should be noted that the destination virtual NIC here may be, for example, the first virtual NIC 801A.

The first virtual NIC 801A is further configured to transfer the data to a corresponding destination virtual machine. It should be noted that, the destination virtual machine here may be, for example, the first virtual machine 802A. The first virtual NIC 801A transfers the data to the virtual NIC driver in the corresponding destination virtual machine, and the virtual NIC driver in the destination virtual machine transfers the data to a client operating system in the destination virtual machine, so that the client operating system in the destination virtual machine transfers the data to a corresponding application in the destination virtual machine (for example, may be the first virtual machine 802A) for processing.

In an implementation manner, the switching module 800 may be configured to search, according to the MAC address that is of the destination node and carried in the data from outside of the physical host, the first mapping table for the destination virtual NIC port corresponding to the MAC address, and transfer the data to the corresponding destination virtual NIC using the destination virtual NIC port. It should be noted that the destination virtual NIC here may be, for example, the first virtual NIC 801A.

In addition, if it is determined that the MAC address that is of the destination node and carried in the data does not exist (or the virtual NIC port corresponding to the MAC address does not exist) in the first mapping table, the data may be directly discarded.

The switching module 800 may further be configured to, when the virtual NIC port corresponding to the MAC address is not found in the first mapping table according to the MAC address that is of the destination node and carried in the data from outside of the physical host, discard the data from outside of the physical host.

For specific implementation of various devices in the foregoing, reference may be made to the foregoing embodiments, and elaborate description is no longer provided herein.

It can be learned from above that, in this embodiment of the present disclosure, in a physical host, during data switching of a virtual machine, communication between virtual machines (for example, a first virtual machine 802A and a second virtual machine 802B) inside the host is distinguished from communication between a virtual machine (for example, the first virtual machine 802A or the second virtual machine 802B) inside the host and a device outside the host. Communication between virtual machines inside the host does not need to pass using a physical NIC 803, and instead, a destination virtual NIC port is directly determined, and communication is then performed with a destination virtual machine using a destination virtual NIC corresponding to the destination virtual NIC port; that is, this case only involves copying of content between the virtual machines, and therefore, PCI bus bandwidth is not wasted, data switching efficiency can be improved, and communication between another virtual machine inside the host and a device outside the host is also not affected. In the case of communication between a virtual machine inside the host and a device outside the host, a physical NIC port is determined, and communication is then performed with the device outside the physical host using a physical NIC 803 corresponding to the physical NIC port; because all communication performed with a device outside the physical host needs to pass using a physical NIC 803, it is convenient to control data entering the physical host. For example, as long as a promiscuous mode is not enabled for the physical NIC 803, it can be controlled that all data entering the physical host is valid data, and consumption caused by invalid data is reduced, thereby further improving data switching efficiency.

In addition, because both data receiving and sending of a virtual machine need to be processed by a physical host, it is convenient to provide a further function to the virtual machine inside the host subsequently. For example, ACL and flow control functions may be provided to the virtual machine inside the host. That is, the solution can improve data switching efficiency without lowering performance and flexibility of the solution, eliminate, to a certain extent, impact of communication between virtual machines inside a host on communication between another virtual machine inside the host and a device outside the host, and make it convenient to provide a further function to the virtual machine inside the host subsequently, for example, provide the ACL and flow control functions.

Embodiment 10

Figure 8B:
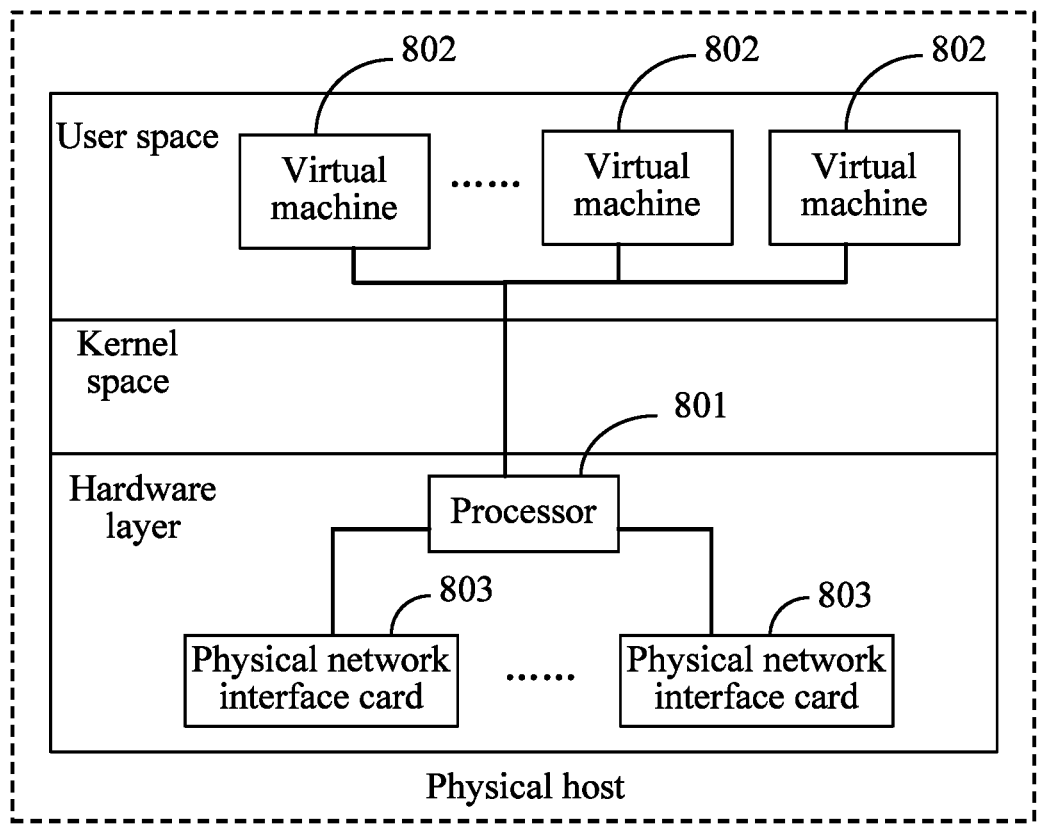
FIG. 8B is another schematic structural diagram of a physical host according to an embodiment of the present disclosure.

Correspondingly, this embodiment of the present disclosure further provides a physical host. As shown in FIG. 8B, the physical host includes at least one virtual machine 802 run in a user space of the physical host, and a processor 801 and at least one physical NIC 803 that are located at a hardware layer of the physical host, where the processor 801 is configured to acquire data that is inside the physical host and needs to be sent to a destination node, where a MAC address of the destination node is carried in the data; determine, according to the MAC address that is of the destination node and carried in the data, whether the destination node is a node inside the host or a node outside the host; and if the destination node is a node inside the host, determine a destination virtual NIC port, send the data to a corresponding destination virtual machine 802 using a virtual NIC corresponding to the destination virtual NIC port; or if the destination node is a node outside the host, determine a physical NIC port, and send the data to a physical NIC 803 corresponding to the physical NIC port; the virtual machine 802 is configured to receive the data sent by the processor 801; and the physical NIC 803 is configured to receive the data sent by the processor 801, and send the data outside the physical host.

Optionally, the processor 801 may be configured to acquire the data that is inside the physical host and needs to be sent to the destination node; determine whether the MAC address that is of the destination node and carried in the data exists in a first mapping table; and if yes, determine that the destination node is a node inside the host, search, according to the MAC address that is of the destination node and carried in the data, the first mapping table for the destination virtual NIC port corresponding to the MAC address, and send the data to the corresponding destination virtual machine 802 using the virtual NIC corresponding to the virtual NIC port; or if not, determine that the destination node is a node outside the host, determine the physical NIC port, and send the data to the physical NIC 803 corresponding to the physical NIC port.

Alternatively, optionally, the processor 801 may be configured to search, according to the MAC address that is of the destination node and carried in the data, a first mapping table for a virtual NIC port corresponding to the MAC address (that is, the destination virtual NIC port); and if the virtual NIC port corresponding to the MAC address is found, determine that the destination node is a node inside the host, determine that the found virtual NIC port corresponding to the MAC address is the destination virtual NIC port, and send the data to the corresponding destination virtual machine 802 using the virtual NIC corresponding to the destination virtual NIC port; or if the virtual NIC port corresponding to the MAC address is not found, determine that the destination node is a node outside the host, determine the physical NIC port, and send the data to the physical NIC 803 corresponding to the physical NIC port.

A second mapping table may be searched according to a source virtual NIC port carried in the data to obtain a physical NIC port corresponding to the source virtual NIC port.

The processor 801 may be configured to, when it is determined that the destination node is a node outside the host, acquire a source virtual NIC port of the data, search the second mapping table according to the source virtual NIC port carried in the data to obtain a physical NIC port corresponding to the source virtual NIC port, and send the data to a physical NIC corresponding to the physical NIC port.

The first mapping table may include information such as a correspondence between MAC addresses and virtual NIC ports (in_port), for example, the first mapping table may be a mac-port table. The second mapping table may include a correspondence between virtual NIC ports and physical NIC ports. The virtual NIC ports and the physical NIC ports may be in a one-to-one relationship, or may also be in a multiple-to-one relationship, that is, one same physical NIC port may correspond to multiple virtual NIC ports.

It should be noted that, the destination virtual NIC port in the first mapping table is generated when a virtual NIC (a back-end virtual NIC) is connected to the host, and is deleted when the back-end virtual NIC is removed; MAC address learning (MAC-learning) may not be performed, the first mapping table changes only when a back-end virtual NIC is inserted or removed, and MAC address learning does not need to be performed packet by packet. A physical NIC port is generated when a physical NIC is connected to the physical host, and is deleted when the physical NIC is removed from the physical host.

In addition, it should further be noted that, a physical NIC port is generated when a physical NIC 803 is connected to the physical host, and is deleted when the physical NIC 803 is removed from the physical host. In addition, when a correspondence (or referred to as a mapping relationship) is established between virtual NIC ports and physical NIC ports, a MAC address of a back-end virtual NIC is also delivered into a unicast list of a physical NIC corresponding to the physical NIC port, so that when receiving data, the physical NIC 803 can filter the data.

Optionally, the physical NIC 803 is further configured to receive data from outside of the physical host, where a MAC address of a destination node is carried in the data from outside of the physical host, and send, to the processor 801, the data from outside of the physical host.

In this case, the processor 801 is further configured to receive the data that is from outside of the physical host and sent by the physical NIC 803, determine, according to the MAC address that is of the destination node and carried in the data from outside of the physical host, a virtual NIC port corresponding to the physical NIC (that is, a destination virtual NIC port), and send, to a destination virtual machine 802, the data from outside of the physical host using a virtual NIC corresponding to the destination virtual NIC port. For example, the processor 801 may be as follows.

The processor 801 may be configured to search, according to the MAC address that is of the destination node and carried in the data from outside of the physical host, the first mapping table for the virtual NIC port corresponding to the MAC address, and send, to the destination virtual machine 802, the data from outside of the physical host using the virtual NIC corresponding to the destination virtual NIC port.

In addition, if it is determined that the MAC address that is of the destination node and carried in the data does not exist (or the virtual NIC port corresponding to the MAC address does not exist) in the first mapping table, the data may be directly discarded.

The processor 801 may further be configured to, when the virtual NIC port corresponding to the MAC address is not found in the first mapping table according to the MAC address that is of the destination node and carried in the data from outside of the physical host, discard the data from outside of the physical host.

It should be noted that, various threads of the processor are mainly run in a kernel space in FIGS. 8A and 8B; for details, reference may be made to the foregoing embodiments, and elaborate description is no longer provided herein.

For specific implementation of various devices in the foregoing, reference may be made to the foregoing embodiments, and elaborate description is no longer provided herein.

It can be learned from above that when a processor 801 of a physical host in this embodiment of the present disclosure performs data switching of a virtual machine, communication between virtual machines is distinguished from communication between a virtual machine and a device which is outside the host. Communication between virtual machines does not need to pass using a physical NIC 803, and instead, a destination virtual NIC port is directly determined, and communication is then performed with a destination virtual machine 802 using a virtual NIC port; that is, this case only involves copying of content between virtual machines 802, and therefore, PCI bus bandwidth is not wasted, and communication between another virtual machine 802 and a device which is outside the host is also not affected. In the case of communication with a device outside the host, a destination physical NIC 803 needs to be determined, and communication is then performed with the device outside the physical host through the destination physical NIC 803; because all communication performed with a device outside the physical host needs to pass using a physical NIC 803, it is convenient to control data entering the physical host. For example, as long as a promiscuous mode is not enabled for the physical NIC 803, it can be controlled that all data entering the physical host is valid data, consumption caused by invalid data is reduced, and data switching efficiency can be improved. In addition, because both the data receiving and sending of a virtual machine 802 need to be processed by the physical host, ACL and flow control functions may be provided to the virtual machine 802 inside the host. That is, the solution can improve data switching efficiency without lowering performance and flexibility of the solution, eliminate impact of communication between virtual machines inside a host on communication between another virtual machine 802 and a device which is outside the host, and achieve that the ACL and flow control functions are provided to the virtual machine 802 inside the host.

Embodiment 11

Figure 9:
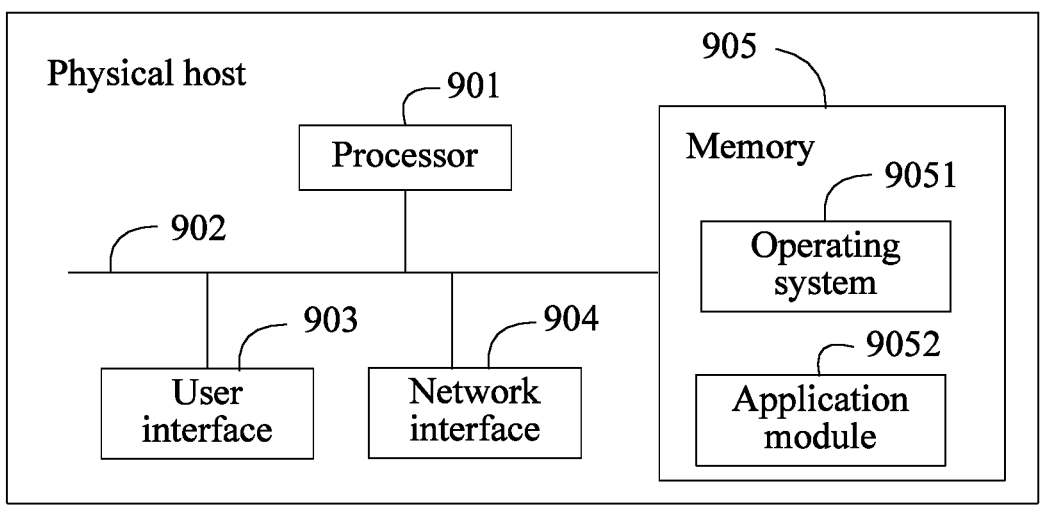
FIG. 9 is yet another schematic structural diagram of a physical host according to an embodiment of the present disclosure.

Correspondingly, this embodiment of the present disclosure further provides a physical host. As shown in FIG. 9, the physical host may include at least one processor 901, for example, a central processing unit (CPU), at least one network interface 904, for example, a physical NIC, or another user interface 903, a memory 905, and at least one communications bus 902.

The communications bus 902 is configured to implement connection and communication between these components.

The network interface 904 is configured to implement connection and communication between the physical host and a network. For example, the network interface 904 may be configured to connect devices such as a physical NIC and/or a physical switch.

Optionally, the user interface 903 may include a display, a keyboard or another click device, for example, a mouse, a trackball, a touchpad or a touch display screen.

The memory 905 may include a high-speed random access memory (RAM), or may also further include a non-volatile memory, for example, at least one disk memory. Optionally, the memory 905 may further include at least one storage apparatus located away from the foregoing processor 901.

In some implementation manners, the memory 905 stores the following elements, executable modules or data structures, or a subset thereof, or an extended set thereof; an operating system 9051, including various system programs, and configured to implement various basic services and process hardware-based tasks; and an application module 9052, including various application programs, and configured to implement various application services.

The application module 9052 includes, but is not limited to, a switching module, various virtual NICs, and virtual NIC related modules, for example, an acquiring unit, a determining unit, a first processing unit, and a second processing unit.

The processor 901 is configured to acquire data that is inside the physical host and needs to be sent to a destination node, where a MAC address of the destination node is carried in the data; determine, according to the MAC address that is of the destination node and carried in the data, whether the destination node is a node inside the physical host or a node outside the physical host; and if the destination node is a node inside the physical host, determine a destination virtual NIC port, and send the data to a corresponding destination virtual machine using a virtual NIC corresponding to the virtual NIC port; or if the destination node is a node outside the physical host, determine a physical NIC port, and send the data to a physical NIC corresponding to the physical NIC port, so as to send the data outside the physical host.

Optionally, the processor 901 is configured to determine whether the MAC address that is of the destination node and carried in the data exists in a first mapping table, where the first mapping table includes a correspondence between MAC addresses and destination virtual NIC ports; and if yes, determine that the destination node is a node inside the host, acquire, according to the MAC address that is of the destination node and carried in the data, the corresponding destination virtual NIC port, and send the data to the destination virtual machine using the virtual NIC corresponding to the destination virtual NIC port; or if not, determine that the destination node is a node outside the host, acquire a corresponding physical NIC port according to a source virtual NIC port of the data, where, for example, the physical NIC port corresponding to the source virtual NIC port of the data may be acquired by searching a second mapping table, and then send the data to a physical NIC corresponding to the physical NIC port, so as to send the data outside the physical host.

Optionally, the processor 901 is further configured to receive data from outside of the physical host using a physical NIC, where a MAC address of a destination node is carried in the data from outside of the physical host; determine, using the physical NIC according to the MAC address that is of the destination node and carried in the data, a corresponding destination virtual NIC port; and send the data to a corresponding destination virtual machine using a virtual NIC corresponding to the destination virtual NIC port; for details, reference may be made to the foregoing embodiments, and elaborate description is no longer provided herein.

For specific implementation of various devices in the foregoing, reference may be made to the foregoing embodiments, and elaborate description is no longer provided herein.

It can be learned from above that when a processor 901 in this embodiment of the present disclosure performs data switching of a virtual machine, communication between virtual machines inside a host is distinguished from communication between a virtual machine and a device which is outside a host. Communication between virtual machines does not need to pass using a physical NIC, and instead, a destination virtual NIC port is directly determined, and communication is then performed with a destination virtual machine using the virtual NIC port; that is, this case only involves copying of content between the virtual machines, and therefore, PCI bus bandwidth is not wasted, and communication between another virtual machine and a device which is outside the host is also not affected. In the case of communication with a device outside a host, a destination physical NIC needs to be determined, and communication is then performed with the device outside the physical host through the destination physical NIC; because all communication performed with a device outside the physical host needs to pass using a physical NIC, it is convenient to control data entering the physical host. For example, as long as a promiscuous mode is not enabled for the physical NIC, it can be controlled that all data entering the physical host is valid data, consumption caused by invalid data is reduced, and data switching efficiency can be improved.

In addition, because both data receiving and sending of a virtual machine need to be processed by a physical host, ACL and flow control functions may be provided to the virtual machine inside the host. That is, the solution can improve data switching efficiency without lowering performance and flexibility of the solution, eliminate impact of communication between virtual machines inside a host on communication between another virtual machine and a device which is outside the host, and achieve that the ACL and flow control functions are provided to the virtual machine inside the host.

A person of ordinary skill in the art may understand that all or some of the steps of the methods in the embodiments may be implemented by a program instructing related hardware. The program may be stored in a computer-readable storage medium. The storage medium may include a read-only memory (ROM), a RAM, a magnetic disk, or an optical disc.

The method for switching data between virtual machines and apparatus and system provided in the embodiments of the present disclosure are described in detail. Specific examples are used in this specification to describe the principle and implementation manners of the present disclosure. The descriptions of the foregoing embodiments are merely intended to help understand the method and core idea of the present disclosure. In addition, a person skilled in the art may, according to the idea of the present disclosure, make modifications with respect to the specific implementation manners and the application scope. Therefore, the content of this specification shall not be construed as a limitation on the present disclosure.

What is claimed is:

1. A method for switching data between virtual machines, wherein the method comprises:
    acquiring, by a switch in a physical host, data to be sent to a destination node external to the physical host;
    acquiring, by the switch in the physical host, a sending virtual network interface card (NIC) port used to receive the data;
    determining, by the switch in the physical host, a physical NIC port corresponding to the sending virtual NIC port by searching a port mapping table, wherein the port mapping table comprises a correspondence between virtual NIC ports and physical NIC ports;
    delivering a media access control (MAC) address of a virtual NIC corresponding to the sending virtual NIC port into a unicast list of a physical NIC corresponding to the physical NIC port; and
    sending the data outside the physical host using the physical NIC corresponding to the physical NIC port.

2. The method of claim 1, wherein after acquiring the data to be sent, the method further comprises determining whether the destination node is internal to the physical host or external to the physical host.

3. The method of claim 2, further comprising:
    determining a receiving destination virtual NIC port; and
    sending the data to a corresponding destination virtual machine using a destination virtual NIC corresponding to the receiving destination virtual NIC port when the destination node is internal to the physical host.

4. The method of claim 2, wherein determining whether the destination node is internal to the physical host or external to the physical host comprises:
    determining whether a destination MAC address exists in a first mapping table; and
    determining that the destination node is internal to the physical host when the destination MAC address exists in the first mapping table; or
    determining that the destination node is external to the physical host when the destination MAC address does not exist in the first mapping table.

5. The method of claim 3, wherein determining the receiving destination virtual NIC port comprises searching, according to the destination MAC address, the first mapping table for a virtual NIC port corresponding to the destination MAC address, and wherein the virtual NIC port corresponding to the destination MAC address is the receiving destination virtual NIC port.

6. The method of claim 4, further comprising:
    generating a new virtual NIC port when the virtual NIC is connected to the physical host;
    adding, to the first mapping table, the new virtual NIC port corresponding to a designated MAC address of the virtual NIC; and
    deleting, from the first mapping table, the new virtual NIC port corresponding to the designated MAC address when the virtual NIC is removed from the physical host.

7. The method of claim 2, wherein determining whether the destination node is internal to the physical host or external to the physical host comprises:
    searching a first mapping table for a virtual NIC port corresponding to a destination MAC address; and
    determining that the destination node is internal to the physical host when the virtual NIC port corresponding to the destination MAC address is found, wherein the virtual NIC port corresponding to the destination MAC address is a receiving destination virtual NIC port when the virtual NIC port corresponding to the destination MAC address is found; or determining that the destination node is external to the physical host when the virtual NIC port corresponding to the destination MAC address is not found.

8. The method of claim 1, further comprising:

receiving data from outside of the physical host using a physical NIC comprising a recipient MAC address of a receiving node;

determining, according to the recipient MAC address, a recipient destination virtual NIC port; and sending, to a recipient destination virtual machine, the data from outside of the physical host using the recipient destination virtual NIC corresponding to the recipient destination virtual NIC port.

9. The method of claim 8, wherein determining the recipient destination virtual NIC port comprises searching a first mapping table for a virtual NIC port corresponding to the recipient MAC address, and wherein the virtual NIC port corresponding to the recipient MAC address is the recipient destination virtual NIC port.

10. The method of claim 9, wherein after receiving the data from outside of the physical host using the physical NIC, the method further comprises discarding the data from outside of the physical host when the recipient MAC address is not found in the first mapping table.

11. A communications system comprising a first physical host and a second physical host, wherein the first physical host is configured to:

acquire, by a switch in the first physical host, data to be sent to the second physical host;

acquire a sending virtual network interface card (NIC) port used to receive the data;

determine, by the switch, a physical NIC port corresponding to the sending virtual NIC port by searching a port mapping table, wherein the port mapping table comprises a correspondence between virtual NIC ports and physical NIC ports;

deliver a media access control (MAC) address of a virtual NIC corresponding to the sending virtual NIC port into a unicast list of a physical NIC corresponding to the physical NIC port; and send the data to the second physical host using the physical NIC corresponding to the physical NIC port.

12. The communications system of claim 11, wherein the first physical host is further configured to determine whether the second physical host is internal to the first physical host or external to the first physical host.

13. The communications system of claim 12, wherein the first physical host is further configured to:

determine whether a destination MAC address exists in a first mapping table;

determine that the second physical host is internal to the first physical host when the destination MAC address exists in the first mapping table;

search the first mapping table for a virtual NIC port corresponding to the destination MAC address, wherein the virtual NIC port corresponding to the destination MAC address is the receiving destination virtual NIC port when the destination MAC address exists in the first mapping table; or determine that the second physical host is external to the first physical host when the destination MAC address does not exist in the first mapping table.

14. The communications system of claim 12, wherein the first physical host is further configured to:

search, according to a destination MAC address, a first mapping table for a virtual NIC port corresponding to the destination MAC address;

determine that the second physical host is internal to the first physical host when the virtual NIC port corresponding to the destination MAC address is found;

determine that the virtual NIC port corresponding to the destination MAC address is the receiving destination virtual NIC port; or determine that the second physical host is external to the first physical host when the destination MAC address is not found.

15. A physical host, comprising:

a memory configured to store instructions; and a processor coupled to the memory and configured to:

acquire data to be sent to a destination node which is external to the physical host;

acquire a sending virtual network interface card (NIC) port used to receive the data;

determine a physical NIC port corresponding to the sending virtual NIC port by searching a second port mapping table, wherein the port mapping table comprises a correspondence between virtual NIC ports and physical NIC ports;

deliver a media access control (MAC) address of a virtual NIC corresponding to the sending virtual NIC port into a unicast list of a physical NIC corresponding to the physical NIC port; and send the data outside the physical host using the physical NIC corresponding to the physical NIC port.

16. The physical host of claim 15, wherein the processor is further configured to determine whether the destination node is internal to the physical host or external to the physical host.

17. The physical host of claim 16, wherein to determine whether the destination node is internal to the physical host or external to the physical host, the processor is further configured to:

determine whether a destination MAC address exists in a first mapping table;

determine that the destination node is internal to the physical host when the destination MAC address exists in the first mapping table;

search, according to the destination MAC address, the first mapping table for a virtual NIC port corresponding to the destination MAC address, wherein the virtual NIC port corresponding to the destination MAC address is a receiving destination virtual NIC port when the destination MAC address exists in the first mapping table; or determine that the destination node is external to the physical host when the destination MAC address does not exist in the first mapping table.

18. The physical host of claim 16, wherein to determine whether the destination node is internal to the physical host or external to the physical host, the processor is further configured to:

search, according to the destination MAC address, a first mapping table for a virtual NIC port corresponding to the destination MAC address;

determine that the virtual NIC port corresponding to the destination MAC address is a receiving destination virtual NIC port when the virtual NIC port corresponding to the destination MAC address is found; or determine that the destination node is external to the physical host when the destination MAC address is not found.

19. The physical host of claim 15, wherein the physical NIC is configured to:
receive data from outside of the physical host comprising a recipient MAC address of a receiving node; and
send, to the processor, the data from outside of the physical host,
wherein the processor is further configured to:
search, according to the recipient MAC address, a first mapping table for a recipient virtual NIC port corresponding to the recipient MAC address, wherein the recipient virtual NIC port corresponding to the recipient MAC address is a recipient destination virtual NIC port; and
send the data to a recipient destination virtual machine using the recipient destination virtual NIC corresponding to the recipient destination virtual NIC port.

20. The physical host of claim 19, wherein after receiving the data from outside of the physical host, the physical NIC is further configured to discard the data from outside of the physical host when the recipient MAC address is not found in the first mapping table.

* * * * *